United States Patent
Harasawa

(10) Patent No.: US 7,031,618 B2
(45) Date of Patent: Apr. 18, 2006

(54) OPTICAL TRANSMISSION SYSTEM IN WHICH GAINS IN GAIN BANDS ARE REMOTELY CONTROLLED BY TRANSMITTING TONE SIGNALS HAVING VARIABLE CHARACTERISTICS

(75) Inventor: Shin-ichirou Harasawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 700 days.

(21) Appl. No.: 10/056,080

(22) Filed: Jan. 28, 2002

(65) Prior Publication Data

US 2003/0020995 A1 Jan. 30, 2003

(30) Foreign Application Priority Data

Jul. 26, 2001 (JP) .............................. 2001-226087

(51) Int. Cl.
  H04B 10/08  (2006.01)
  H04B 10/00  (2006.01)
  H04B 10/02  (2006.01)
  H04J 14/02  (2006.01)

(52) U.S. Cl. .................... 398/177; 398/32; 398/33; 398/37; 398/97; 398/160

(58) Field of Classification Search ............... 398/6, 398/11, 18, 23, 32, 33, 37, 38, 62, 64, 97, 398/157, 160, 177; 359/333–349; 372/70, 372/71, 82, 83, 88

See application file for complete search history.

(56) References Cited

U.S. PATENT DOCUMENTS 5,513,029 A * 4/1996 Roberts ..................... 398/32
5,654,816 A * 8/1997 Fishman ..................... 359/349
5,894,362 A * 4/1999 Onaka et al. ................. 398/95
6,160,649 A * 12/2000 Horiuchi et al. .............. 398/34
6,212,001 B1 * 4/2001 Bode et al. ............... 359/337.1
6,219,176 B1 * 4/2001 Terahara .................. 359/341.1
6,259,553 B1 * 7/2001 Kinoshita ................... 359/337
6,271,945 B1 * 8/2001 Terahara ..................... 398/26
6,510,000 B1 * 1/2003 Onaka et al. ............... 359/334
6,735,395 B1 * 5/2004 Bai ............................ 398/95
2004/0114933 A1 * 6/2004 Shimomura et al. .......... 398/92

FOREIGN PATENT DOCUMENTS

EP          0782 225       7/1997

(Continued)

OTHER PUBLICATIONS

Combined Search and Examination Report for corresponding UK Application No. GB0502271.0 mailed Mar. 31, 2005.*

(Continued)

*Primary Examiner*—M. R. Sedighian
*Assistant Examiner*—Dalzid Singh
(74) *Attorney, Agent, or Firm*—Staas & Halsey LLP

(57) ABSTRACT

In an optical transmission system, an optical terminal transmits a plurality of tone signals corresponding to a plurality of gain bands, where the frequencies of the plurality of tone signals are different from each other, and each of the plurality of tone signals has a characteristic which is varied according to detected power of optical signals in the corresponding gain band. Each optical repeater receives the plurality of tone signals, extracts the characteristics of the plurality of tone signals, and compares a signal representing each characteristic with a reference signal. The optical repeater controls the gains of optical amplification in the plurality of gain bands based on the comparison result so as to equalize the gains in the plurality of gain bands.

20 Claims, 21 Drawing Sheets

FOREIGN PATENT DOCUMENTS

| | | |
|---|---|---|
| EP | 782289 | 7/1997 |
| EP | 0917313 | 5/1999 |
| EP | 933 894 | 8/1999 |
| GB | 2280561 | 2/1995 |
| GB | 2327309 | 1/1999 |
| JP | 2001007768 | 1/2001 |

OTHER PUBLICATIONS

Combined Search and Examination Report for corresponding UK Application No. GB0502272.8 mailed Mar. 31, 2005.*

* cited by examiner

MODULATION DEPTH OF T1 = MODULATION DEPTH OF T2

MODULATION DEPTH OF T1 < MODULATION DEPTH OF T2

MODULATION DEPTH OF T1 > MODULATION DEPTH OF T2

FREQUENCY DIFFERENCE D1 = FREQUENCY DIFFERENCE D2

FREQUENCY DIFFERENCE D1 > FREQUENCY DIFFERENCE D2

FREQUENCY DIFFERENCE D1 < FREQUENCY DIFFERENCE D2

OPTICAL TRANSMISSION SYSTEM IN WHICH GAINS IN GAIN BANDS ARE REMOTELY CONTROLLED BY TRANSMITTING TONE SIGNALS HAVING VARIABLE CHARACTERISTICS

BACKGROUND OF THE INVENTION

1) Field of the Invention

The present invention relates to an optical transmission system in which optical amplification is realized in a plurality of gain bands. The present invention also relates to an optical terminal used in the above optical transmission system. The present invention further relates to an optical repeater used in the above optical transmission system.

2) Description of the Related Art

Recently, optical fiber amplifiers which utilize a nonlinear optical phenomenon occurring in optical fibers and being called Raman amplification are receiving attention in the field of optical communications. In the Raman amplification, a physical phenomenon in which vibrations of materials inelastically scatter incident light so as to produce Raman scattered light having a wavelength which is different from the wavelength of the incident light is utilized, and strong excitation light is injected into an optical-fiber transmission line so that optical amplification occurs in the entire optical-fiber transmission line. For example, excitation light having a wavelength of 1.45 micrometers is injected into the optical-fiber transmission line in order to amplify an optical signal having a wavelength of 1.55 micrometers.

When repeaters are arranged to realize the Raman amplification, a longer optical fiber cable can be laid, and intervals between broadband repeaters can be increased.

Usually, excitation light of more than one wavelength is used for realizing Raman amplification in more than one gain band corresponding to the more than one wavelength, where the excitation light having more than one wavelength is generated by more than one light source having predetermined output power. When the number of optical signals transmitted in each gain band is identical, an identical gain is achieved in each gain band, and satisfactory transmission characteristics are obtained.

However, when the number of optical signals transmitted in one gain band is smaller than the number (or numbers) of the other gain band (or gain bands), the power of excitation light corresponding to the gain band in which the smaller number of optical signals are transmitted is intensively converted into the optical signals in the smaller number. Therefore, gains in the respective gain bands differ, and thus transmission characteristics deteriorate.

SUMMARY OF THE INVENTION

An object of the present invention is to provide an optical transmission system in which deterioration of transmission characteristics can be suppressed and high-quality optical transmission can be realized.

Another object of the present invention is to provide an optical terminal which can suppress deterioration of transmission characteristics and realize high-quality optical transmission.

A further object of the present invention is to provide an optical repeater which can suppress deterioration of transmission characteristics and realize high-quality optical transmission.

(1) According to the first aspect of the present invention, there is provided an optical transmission system comprising an optical terminal, an optical-fiber transmission line connected to the optical terminal, and an optical repeater arranged along the optical-fiber transmission line. The optical terminal includes an optical-signal power detection unit, a tone-signal generation unit, and an optical transmission unit. The optical-signal power detection unit detects power of optical signals transmitted from the optical terminal in each of a plurality of gain bands. The tone-signal generation unit generates a plurality of tone signals respectively corresponding to the plurality of gain bands, where each of the plurality of tone signals has a different frequency and a characteristic corresponding to the power of optical signals in one of the plurality of gain bands corresponding to the tone signal. The optical transmission unit transmits the plurality of tone signals together with optical signals through the optical-fiber transmission line. The optical repeater includes an optical amplification unit, a characteristic-signal generation unit, and a gain control unit. The optical amplification unit realizes optical amplification in each of the plurality of gain bands with a gain which is determined based on a control signal. The characteristic-signal generation unit receives the plurality of tone signals, and generates a plurality of characteristic signals each representing the characteristic of one of the plurality of tone signals. The gain control unit compares each of the plurality of characteristic signals with a reference signal, and generates the control signal corresponding to each of the plurality of gain bands so as to equalize the gain in the optical amplification in each of the plurality of gain bands.

The optical transmission system according to the first aspect of the present invention may have one or any possible combination of the following additional features (i) to (v).

(i) The optical amplification unit injects excitation light into the optical-fiber transmission line, which is used as an amplification medium in the optical amplification.

(ii) The characteristic-signal generation unit comprises a photoelectric conversion unit which receives the plurality of tone signals, and generates an electric signal representing the plurality of tone signals; a plurality of frequency filters which respectively extract the plurality of tone signals from the electric signal; and a smoothing unit which smoothes the plurality of tone signals extracted by the plurality of frequency filters so as to generate the plurality of characteristic signals.

(iii) The characteristic of each of the plurality of tone signals is the frequency of the tone signal or a modulation depth with which the tone signal is modulated. In this case, the tone-signal generation unit decreases the modulation depth of one of the plurality of tone signals or increases a difference between a predetermined frequency and the frequency of the one of the plurality of tone signals in order to increase the gain in the optical amplification in one of the plurality of gain bands corresponding to the one of the plurality of tone signals, and the tone-signal generation unit increases the modulation depth of one of the plurality of tone signals or decreases a difference between the predetermined frequency and the frequency of the one of the plurality of tone signals in order to decrease the gain in the optical amplification in one of the plurality of gain bands corresponding to the one of the plurality of tone signals.

(iv) The optical amplification unit includes more than two excitation light sources each of which emits excitation light having a different wavelength, and the optical transmission system further comprises an optical multiplexing unit which optically multiplexes the excitation light emitted by the more than two excitation light sources.

(v) The optical transmission system according to the first aspect of the present invention further comprises a driving control unit which activates and deactivates the optical amplification unit.

(2) According to the second aspect of the present invention, there is provided an optical transmission system comprising an optical terminal, a plurality of optical-fiber transmission lines connected to the optical terminal, and an optical repeater arranged along the plurality of optical-fiber transmission lines. The optical terminal includes an optical-signal power detection unit, a tone-signal generation unit, and an optical transmission unit. The optical-signal power detection unit detects power of optical signals transmitted from the optical terminal in each of a plurality of gain bands through each of the plurality of optical-fiber transmission lines. The tone-signal generation unit generates a plurality of tone signals respectively corresponding to the plurality of gain bands for each of the plurality of optical-fiber transmission lines, where each of the plurality of tone signals has a different frequency, and each of the plurality of tone signals for each of the plurality of optical-fiber transmission lines has a characteristic corresponding to the power of optical signals transmitted in one of a plurality of gain bands corresponding to the tone signal in the optical-fiber transmission line. The optical transmission unit transmits the plurality of tone signals together with optical signals through each of the plurality of optical-fiber transmission lines. The optical repeater includes an optical amplification unit, a characteristic-signal generation unit, an averaging unit, and a gain control unit. The optical amplification unit realizes optical amplification in each of the plurality of gain bands with a gain which is determined based on a control signal. The characteristic-signal generation unit receives the plurality of tone signals from each of the plurality of optical-fiber transmission lines, and generates a plurality of characteristic signals each representing the characteristic of one of the plurality of tone signals received from each of the plurality of optical-fiber transmission lines. The averaging unit obtains for each of the plurality of gain bands an average of ones of the plurality of characteristic signals corresponding to both of the plurality of optical-fiber transmission lines and the gain band. The gain control unit compares the average with a reference signal, and generates the control signal for each of the plurality of gain bands so as to equalize the gain in the optical amplification in each of the plurality of gain bands.

(3) According to the third aspect of the present invention, there is provided an optical transmission system comprising an optical terminal, an optical-fiber transmission line connected to the optical terminal, and an optical repeater arranged along the optical-fiber transmission line. The optical terminal includes an optical-signal power detection unit, a tone-signal generation unit, and an optical transmission unit. The optical-signal power detection unit detects power of optical signals transmitted from the optical terminal in each of a plurality of gain bands. The tone-signal generation unit generates a plurality of tone signals respectively corresponding to the plurality of gain bands, where each of the plurality of tone signals has a different frequency and a characteristic corresponding to the power of optical signals in one of the plurality of gain bands corresponding to the tone signal. The optical transmission unit transmits the plurality of tone signals together with optical signals through the optical-fiber transmission line. The optical repeater includes a first optical amplification unit, a second optical amplification unit, a characteristic-signal generation unit, and a gain control unit. The first optical amplification unit realizes optical amplification in a first one of the plurality of gain bands with constant light emission. The second optical amplification unit realizes optical amplification in each of the plurality of gain bands except for the first one of the plurality of gain bands with a gain which is determined based on a control signal. The characteristic-signal generation unit receives the plurality of tone signals, and generates a plurality of characteristic signals each representing the characteristic of one of the plurality of tone signals. The gain control unit compares each of the plurality of characteristic signals corresponding to the plurality of gain bands except for the first one of the plurality of gain bands, with a reference signal, and generates the control signal corresponding to each of the plurality of gain bands except for the first one of the plurality of gain bands so as to equalize the gain in the optical amplification in each of the plurality of gain bands, where the reference signal is one of the plurality of characteristic signals corresponding to the first one of the plurality of gain bands.

The optical-fiber transmission line according to the third aspect of the present invention may have one or any possible combination of the aforementioned additional features (ii) and (iii) the following additional features (vi) to (viii).

(vi) The first optical amplification unit and the second optical amplification unit inject excitation light into the optical-fiber transmission line, which is used as an amplification medium in the optical amplification.

(vii) The first optical amplification unit and the second optical amplification unit include more than two excitation light sources each of which emits excitation light having a different wavelength, and the optical transmission system further comprises an optical multiplexing unit which optically multiplexes the excitation light emitted by the more than two excitation light sources.

(viii) The optical transmission system according to the third aspect of the present invention may further comprise a driving control unit which activates and deactivates the second optical amplification unit.

(4) According to the fourth aspect of the present invention, there is provided an optical transmission system comprising an optical terminal, a plurality of optical-fiber transmission lines connected to the optical terminal, and an optical repeater arranged along the plurality of optical-fiber transmission lines. The optical terminal includes an optical-signal power detection unit, a tone-signal generation unit, and an optical transmission unit. The optical-signal power detection unit detects power of optical signals transmitted from the optical terminal in each of a plurality of gain bands through each of the plurality of optical-fiber transmission lines. The tone-signal generation unit generates a plurality of tone signals respectively corresponding to the plurality of gain bands for each of the plurality of optical-fiber transmission lines, where each of the plurality of tone signals has a different frequency, and each of the plurality of tone signals for each of the plurality of optical-fiber transmission lines has a characteristic corresponding to the power of optical signals transmitted in one of a plurality of gain bands corresponding to the tone signal in the optical-fiber transmission line. The optical transmission unit transmits the plurality of tone signals together with optical signals through each of the plurality of optical-fiber transmission lines. The optical repeater includes a first optical amplification unit, a second optical amplification unit, a characteristic-signal generation unit, an averaging unit, and a gain control unit.

The first optical amplification unit realizes optical amplification in a first one of the plurality of gain bands in each of the plurality of optical-fiber transmission lines with constant light emission. The second optical amplification unit realizes optical amplification in each of the plurality of gain bands except for the first one of the plurality of gain bands in each of the plurality of optical-fiber transmission lines, with a gain which is determined based on a control signal. The characteristic-signal generation unit receives the plurality of tone signals from each of the plurality of optical-fiber transmission lines, and generates a plurality of characteristic signals each representing the characteristic of one of the plurality of tone signals received from each of the plurality of optical-fiber transmission lines. The averaging unit obtains for each of the plurality of gain bands an average of ones of the plurality of characteristic signals corresponding to both of the plurality of optical-fiber transmission lines and the gain band. The gain control unit compares the average obtained for each of the plurality of gain bands except for the first one of the plurality of gain bands, with a reference signal, and generates the control signal for each of the plurality of gain bands except for the first one of the plurality of gain bands so as to equalize the gain in the optical amplification in each of the plurality of gain bands, where the reference signal is the average obtained for the first one of the plurality of gain bands.

(5) According to the present invention, the optical terminal transmits a plurality of tone signals corresponding to a plurality of gain bands, where the frequencies of the plurality of tone signals are different from each other, and each of the plurality of tone signals has a characteristic which is varied according to detected power of optical signals in a gain band corresponding to the tone signal. Each optical repeater controls gains in optical amplification in the plurality of gain bands based on the plurality of tone signals so as to equalize the gains. That is, the gains in optical amplification in each gain band can be flexibly varied according to the power of the optical signals in the corresponding gain band. Therefore, it is possible to suppress deterioration of transmission characteristics, and realize high quality optical transmission.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Embodiments of the present invention are explained in detail below with reference to drawings.

(1) Optical Transmission System

Figure 1:
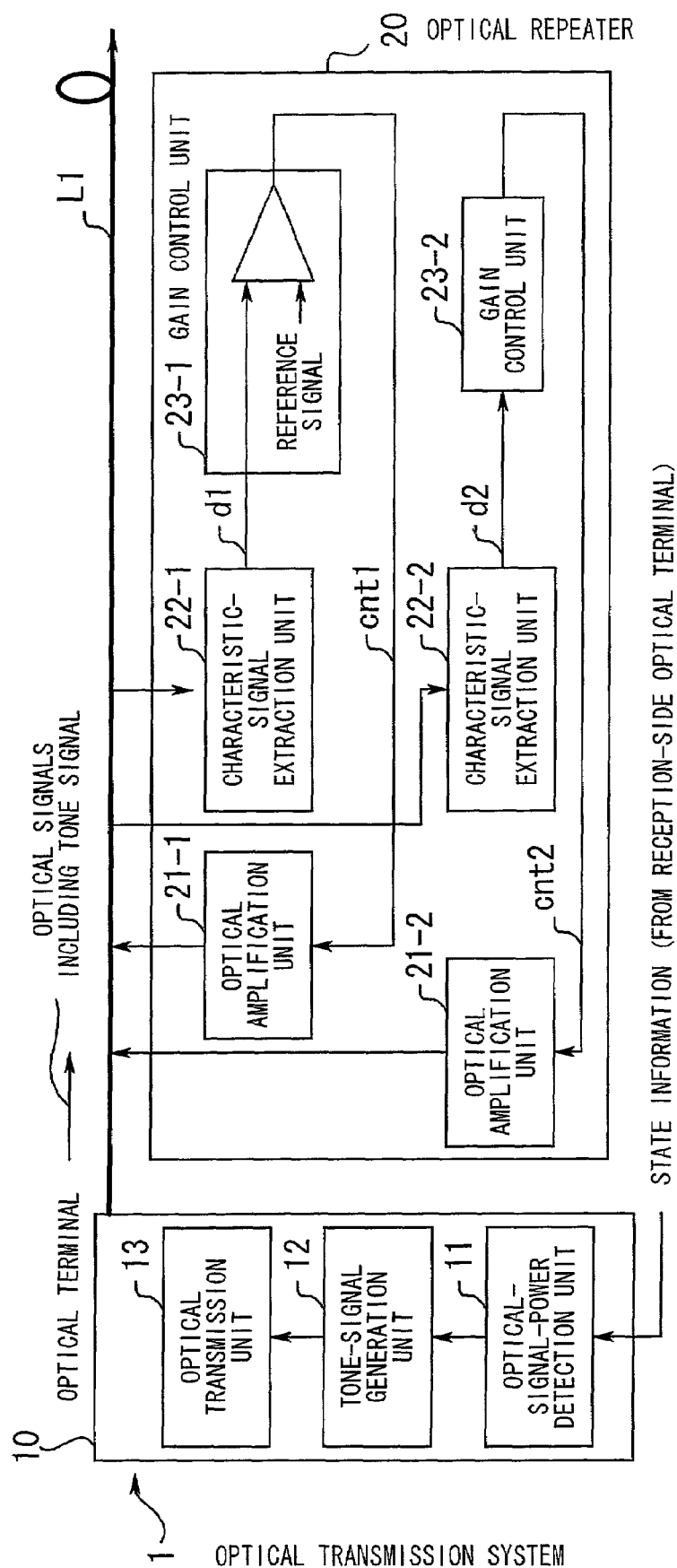
FIG. 1 is a diagram illustrating a construction of an optical transmission system according to the present invention.

FIG. 1 is a diagram illustrating a construction of an optical transmission system according to the present invention. The optical transmission system 1 of FIG. 1 comprises a pair of optical terminals and a plurality of optical repeaters, although only one of the pair of optical terminals 10 and only one of the plurality of optical repeaters 20 are illustrated in FIG. 1. In the optical transmission system 1 of FIG. 1, the pair of optical terminals are connected with an optical-fiber transmission line L1, and the plurality of optical repeaters are arranged along the optical-fiber transmission line L1 for realizing long-distance optical transmission. For example, in submarine optical transmission systems, the optical-fiber transmission line and the plurality of optical repeaters 20 are laid in the sea, and the pair of optical terminals 10 are arranged in land stations.

Each optical terminal 10 comprises an optical-signal-power detection unit 11, a tone-signal generation unit 12, and an optical transmission unit 13.

The optical-signal-power detection unit 11 detects power of at least one optical signal (e.g., service signal) which is transmitted from the optical terminal 10 through the upstream transmission line L1 in each of a plurality of gain bands. For example, when an opposite (reception-side) optical terminal (not shown) detects the power of the at least one optical signal which is transmitted from the above (transmission-side) optical terminal 10 in each gain band and received by the opposite optical terminal, and information on the detected power is transmitted from the reception-side optical terminal to the transmission-side optical terminal 10 through a downstream transmission line (not shown), the transmission-side optical terminal 10 can detect the power of the at least one optical signal transmitted from the optical terminal 10 in each gain band. The information on the power detected by the reception-side optical terminal may be included in state information which is transmitted from the reception-side optical terminal to the transmission-side optical terminal 10 through the downstream transmission line.

The tone-signal generation unit 12 generates a tone signal in each gain band, where the tone signal in each gain band has a different frequency. At this time, the tone-signal generation unit 12 changes a characteristic (e.g., a modulation depth or the frequency) of the tone signal according to the power of the at least one optical signal so that gains in the plurality of gain bands are equalized. The optical transmission unit 13 transmits the tone signal together with other optical signals such as service signals.

The optical repeater 20 comprises, for each gain band, an optical amplification unit 21-i, a characteristic-signal extraction unit 22-i, and a gain control unit 23-i, where i=1 to n, and n is the number of the plurality of (Raman) gain bands. In FIG. 1, constituents for two gain bands are illustrated in the optical repeater 20.

The optical amplification unit 21-i corresponding to each gain band i realizes optical amplification with a gain determined based on a control signal cnti which is generated by the gain control unit 23-i corresponding to the gain band i, where the optical amplification is Raman amplification which uses the optical-fiber transmission line as an amplification medium and is realized by injecting excitation light into the optical-fiber transmission line.

The characteristic-signal extraction unit 22-i corresponding to each gain band i extracts a tone signal transmitted from the optical terminal 10, and generates a characteristic signal di corresponding to the gain band i. The gain control unit 23-i corresponding to each gain band i compares the characteristic signal di with a reference signal, and generates the control signal cnti which is used by the optical amplification unit 21-i corresponding to the gain band i for variable control of the gain in the gain band i so that the gains in the plurality of gain bands are equalized. The reference signal is preset in the optical repeater 20.

Figure 2:
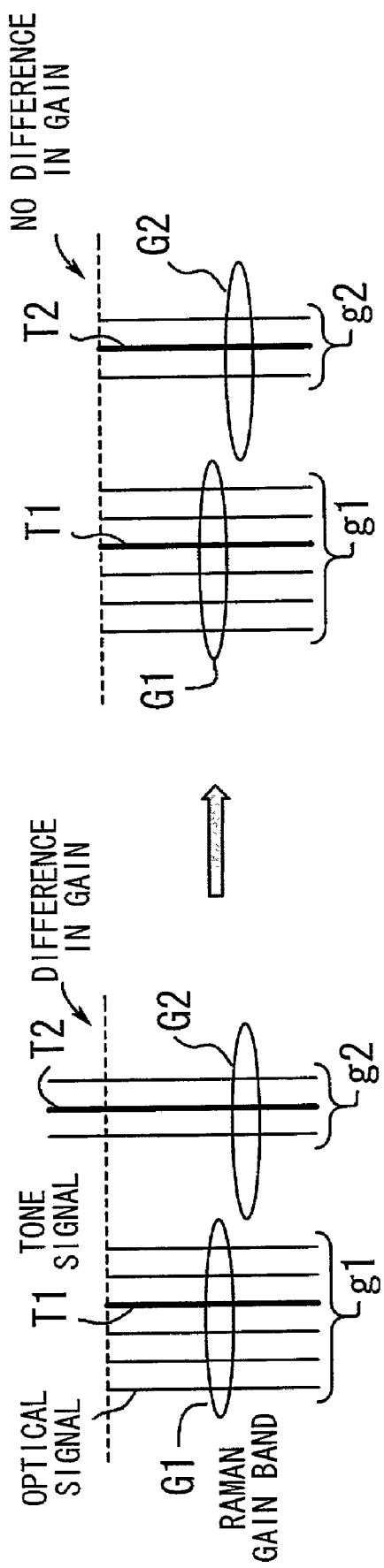
FIG. 2 is a diagram schematically illustrating operations of the optical transmission system of FIG. 1.

The operations of the above optical transmission system are briefly explained with reference to FIG. 2.

When a group g1 of signals including a tone signal Ti and other optical signals are transmitted in the (Raman) gain band G1, and a group g2 of signals including a tone signal T2 and other optical signals are transmitted in the (Raman) gain band G2, and the number of the optical signals included in the group g2 is greater than the number of the optical signals included in the group g1, the gain in the gain band G2 increases. Therefore, a difference arises in the gain between the gain bands G1 and G2, and the transmission quality deteriorates.

In the above case, in order to decrease the gain in the gain band G2, the optical terminal 10 transmits to the optical repeater 20 a tone signal T2 having an increased modulation depth or a frequency which is brought closer to a predetermined frequency. When the optical repeater 20 receives the tone signal T2, the optical repeater 20 generates a control signal cnt2 which decreases the gain band G2, and realizes optical amplification based on the control signal cnt2. Thus, the gain in the gain band G2 is decreased.

Alternatively, in the above case, the gains in the gain bands G1 and G2 can be equalized by increasing the gain in the gain band G1. That is, the optical terminal 10 transmits to the optical repeater 20 a tone signal T1 having a decreased modulation depth or a frequency more apart from the predetermined frequency. When the optical repeater 20 receives the tone signal T1, the optical repeater 20 generates a control signal cnt1 which increases the gain band G1, and realizes optical amplification based on the driving current cnt1. Thus, the gain in the gain band G1 is increased.

Further, in the above case, the equalization of the gains in the gain bands G1 and G2 can be realized by both of the decrease in the gain in the gain band G2 and increase in the gain in the gain band G1.

Next, the problems to be solved by the invention are described in more detail by referring to FIGS. 3–6.

(2) Problems To Be Solved by Invention

Figure 3:
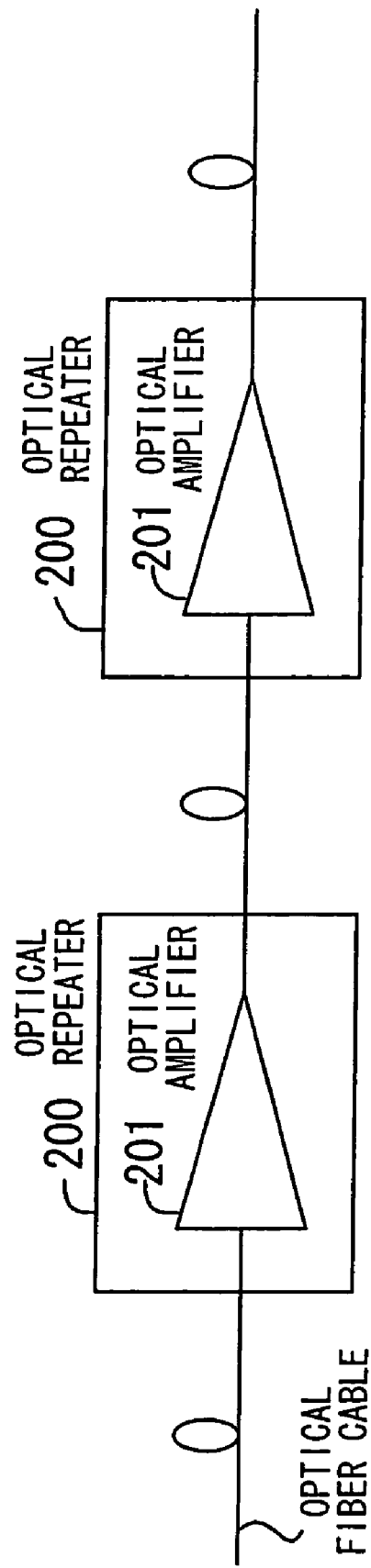
FIG. 3 is a diagram schematically illustrating an arrangement of conventional optical repeaters.

FIG. 3 is a diagram schematically illustrating an arrangement of conventional optical repeaters along an optical-fiber transmission line. Each optical repeater 200 comprises an optical amplifier 201, which is connected to the optical-fiber transmission line, and receives and amplifies optical signals.

Figure 4:
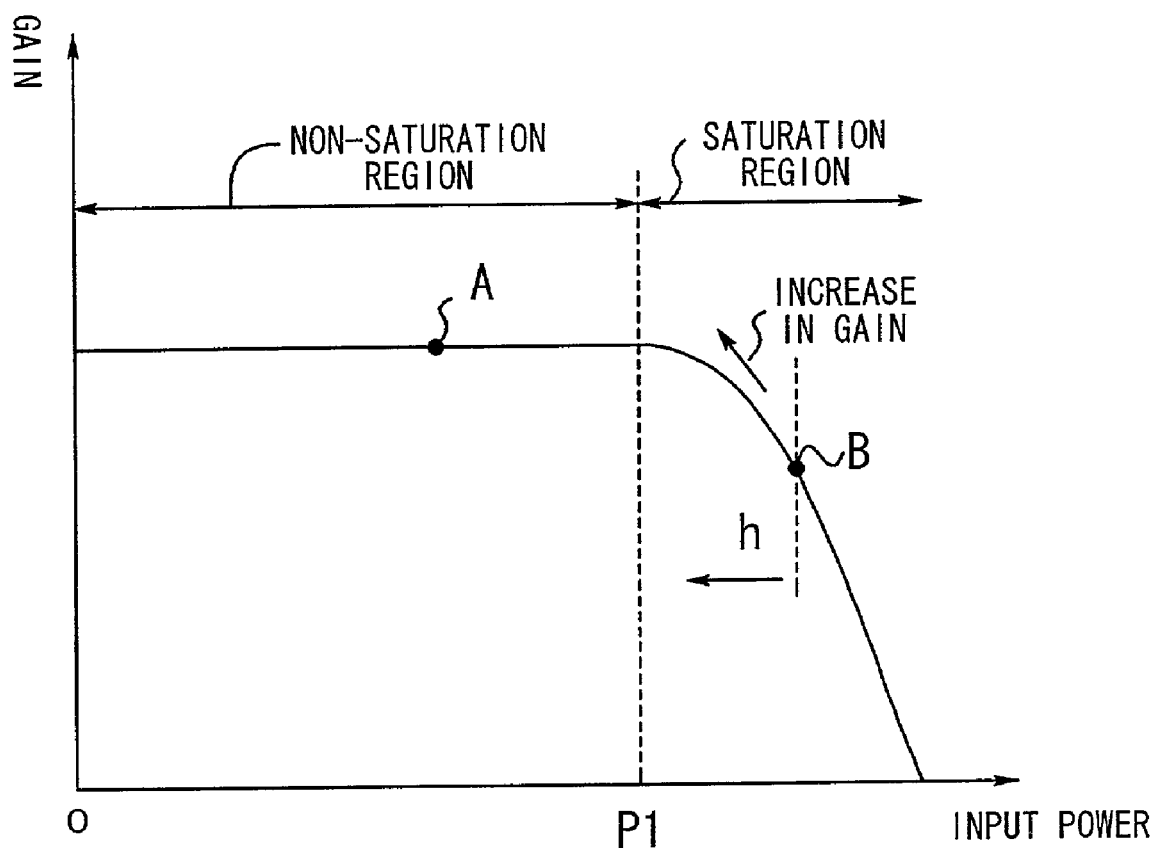
FIG. 4 is a graph indicating a typical characteristic of an optical amplifier.

FIG. 4 is a graph illustrating a typical characteristic of the optical amplifier 201. In FIG. 4, the abscissa corresponds to the input power (i.e., the power of the input optical signal), and the ordinate corresponds to the gain of the optical amplifier 201. The region of the input power from 0 to P1 is a non-saturation region, in which the gain of the optical amplifier 201 is constant. The region of the input power greater than P1 is a saturation region, in which the gain of the optical amplifier 201 decreases with increase in the input power.

When a trouble occurs in the optical-fiber transmission line, input power of an optical repeater located on the forward side of the trouble location decreases. In the case where the operating point of the optical repeater is set at a point A in the non-saturation region illustrated in FIG. 4, the gain of the optical amplifier is constant regardless of the input power. Therefore, when the input power of the optical amplifier decreases, the output power of the optical amplifier also decreases, and the decrease in the power propagates through optical repeaters located on the forward side of the trouble location.

On the other hand, in the case where the operating point is set at a point B in the saturation region illustrated in FIG. 4, the gain of the optical amplifier increases when the input power decreases due to a trouble in the optical-fiber transmission line. Therefore, when the optical signal passes through optical repeaters located on the forward side of the trouble location, the decrease in the input power can be compensated for by the increase in the gains in the optical amplifiers. This effect is called self healing.

Thus, in the current optical repeating systems, the operating point of each optical repeater is set in the saturation region.

Figure 5:
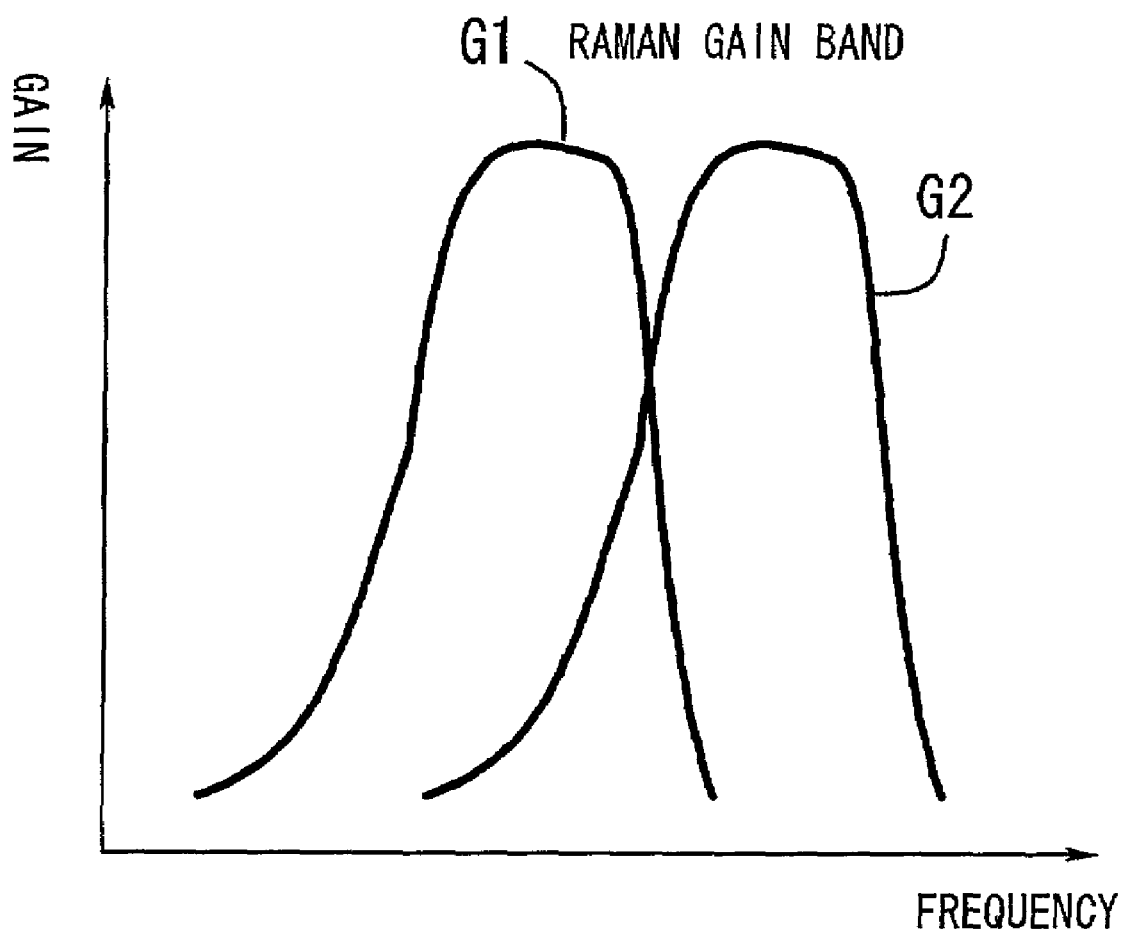
FIG. 5 is a graph indicating examples of Raman gain bands.

FIG. 5 is a graph indicating Raman gain bands of an optical amplifier. In FIG. 5, the abscissa corresponds to the frequency, and the ordinate corresponds to the gain. Two excitation light sources for Raman amplification are provided in the optical amplifier 201 in each optical repeater 200, where the two excitation light sources emit excitation light having different wavelengths. In FIG. 5, two Raman gain bands G1 and G2 are indicated.

Figure 6:
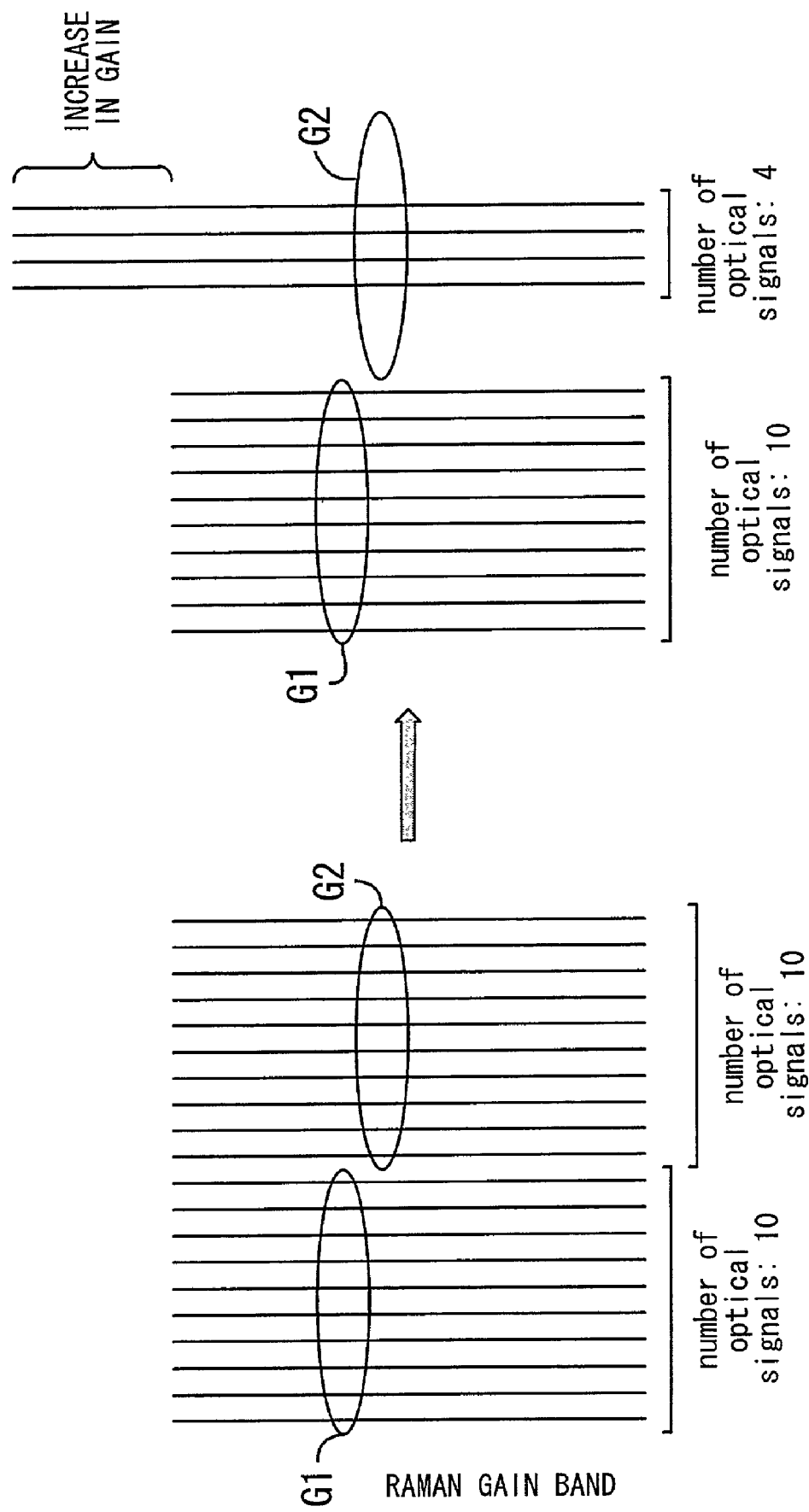
FIG. 6 is an explanatory diagram illustrating a difference in the gain between gain bands in which different numbers of optical signals are transmitted.

FIG. 6 is an explanatory diagram illustrating a difference in the gain between gain bands in which different numbers of optical signals are transmitted.

When each of the Raman gain bands G1 and G2 includes an identical number of optical signals (e.g., ten optical signals), as illustrated on the left side of FIG. 6, the gains in the Raman gain bands G1 and G2 become identical. Therefore, the transmission characteristics do not deteriorate.

On the other hand, when the numbers of the optical signals in the Raman gain bands G1 and G2 are not balanced (e.g., when ten optical signals are transmitted in the Raman gain band G1, and four optical signals are transmitted in the Raman gain band G2, as illustrated on the right side of FIG. 6), the input power in the Raman gain band G2 decreases due to the decrease in the number of the optical signals. Therefore, the gain of the optical signals in the Raman gain band G2 increases as explained with reference to FIG. 4, and the output power in the Raman gain band G2 increases. Thus, the gains in the Raman gain bands G1 and G2 become different.

For example, during initial operations of optical transmission systems, the numbers of the optical signals in the respective Raman gain bands are often unbalanced. In such a situation, transmission characteristics of optical signals having higher power deteriorate due to the difference in the gain between Raman gain bands. That is, the transmission quality deteriorates.

In order to solve this problem, according to the present invention, the Raman gains are flexibly varied according to variations in the power of optical signals (i.e., variations in the number of optical signals) in each Raman gain band so that the deterioration in the transmission characteristics is suppressed, and the reliability and quality of the optical transmission using optical repeaters are improved.

(3) Optical Repeater in First Embodiment

Figure 7:
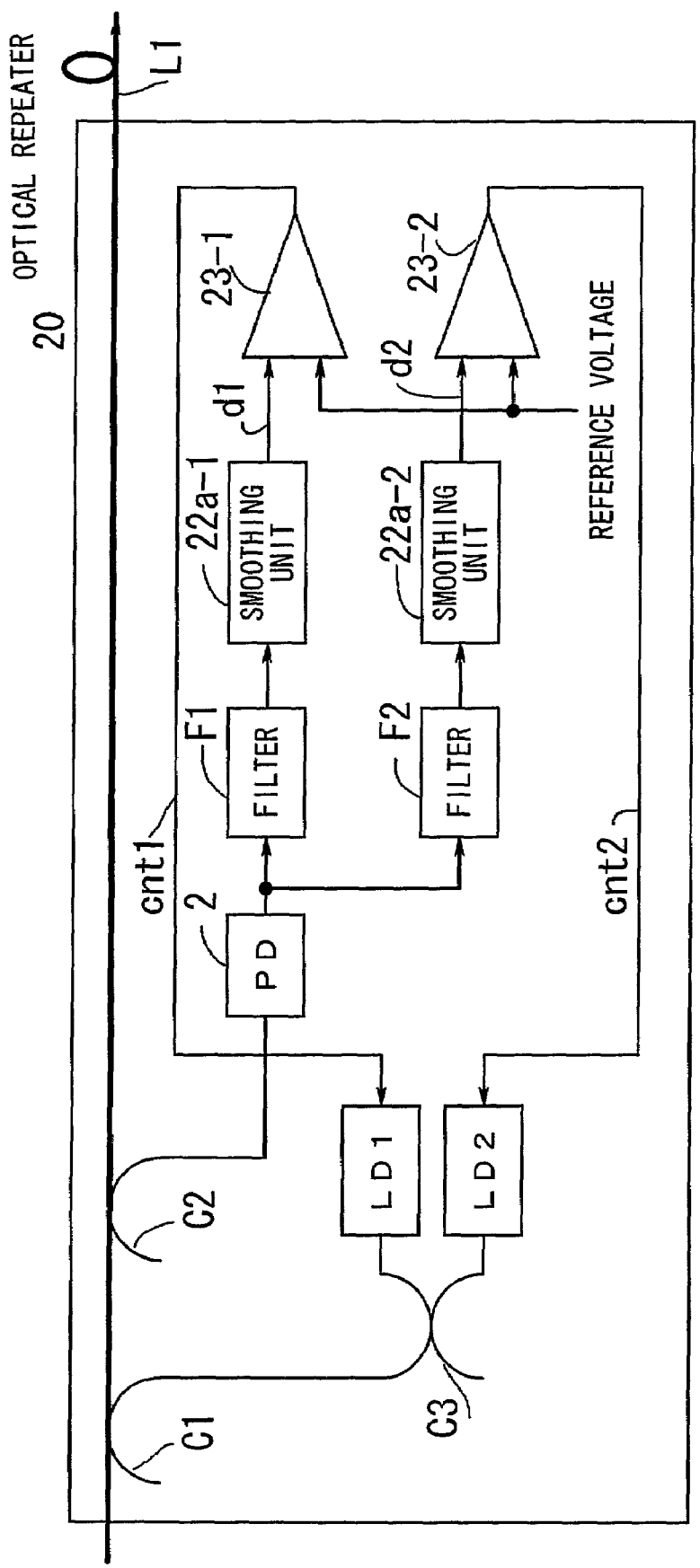
FIG. 7 is a diagram illustrating an example of an optical repeater in a first embodiment of the present invention.

FIG. 7 is a diagram illustrating an example of the optical repeater 20 which is used in the optical transmission system of FIG. 1 in the first embodiment of the present invention. In FIG. 7, only the elements relevant to the present invention are illustrated. The optical repeater of FIG. 7 comprises optical couplers C1 to C3, a photodiode 2, filters F1 and F2, smoothing units 22a-1 and 22a-2, gain control units 23-1 and 23-2, and excitation light sources LD1 and LD2.

The excitation light sources LD1 and LD2 are provided for the excitation light sources in the Raman gain bands G1 and G2, respectively.

The operation for controlling Raman amplification in the Raman gain band G1 is performed as follows.

First, optical signals transmitted from the optical terminal 10 through the upstream transmission line L1 are branched through the optical coupler C2 from the upstream transmission line L1, and received by the photodiode 2.

The photodiode 2 converts the received optical signals into an electric signal. The filter F1 is a band-pass filter which passes the frequency of the tone signal T1, and the filter F2 is a band-pass filter which passes the frequency of the tone signal T2.

The electric signal which has passed through the filter F1 is smoothed by the smoothing unit 22a-1 so as to generate a DC voltage d1 as a characteristic signal. The gain control unit 23-1 compares the DC voltage d1 with a reference voltage (reference signal), and outputs a driving current as the aforementioned control signal cnt1 based on the result of the comparison, where the excitation light source LD1 is driven with the driving current cnt1. The output power of the excitation light source LD1 can be controlled according to the driving current cnt1, and therefore the gain in the Raman gain band G1 can be varied according to the control signal cnt1.

The excitation light source LD1 emits excitation light according to the control signal cnt1, and the excitation light emitted from the excitation light source LD1 is injected into the upstream transmission line L1 through the optical couplers C3 and C1. Thus, backward Raman pumping is realized.

The operation for controlling Raman amplification in the Raman gain band G2 is performed in a similar manner to the above operation for controlling Raman amplification in the Raman gain band G1.

Next, details of the operations for controlling the gains in the Raman gain bands G1 and G2 are explained below.

In order to increase or decrease the gain in one of the Raman gain bands G1 and G2, the optical terminal 10 transmits a tone signal having a modulation depth or a frequency which is appropriately set for the Raman gain band, and the optical repeater 20 controls one of the excitation light sources LD1 and LD2 corresponding to the received tone signal according to the modulation depth or the frequency of the received tone signal so that the gain is desirably controlled.

First, the gain control based on the modulation depth is explained.

Figure 8:
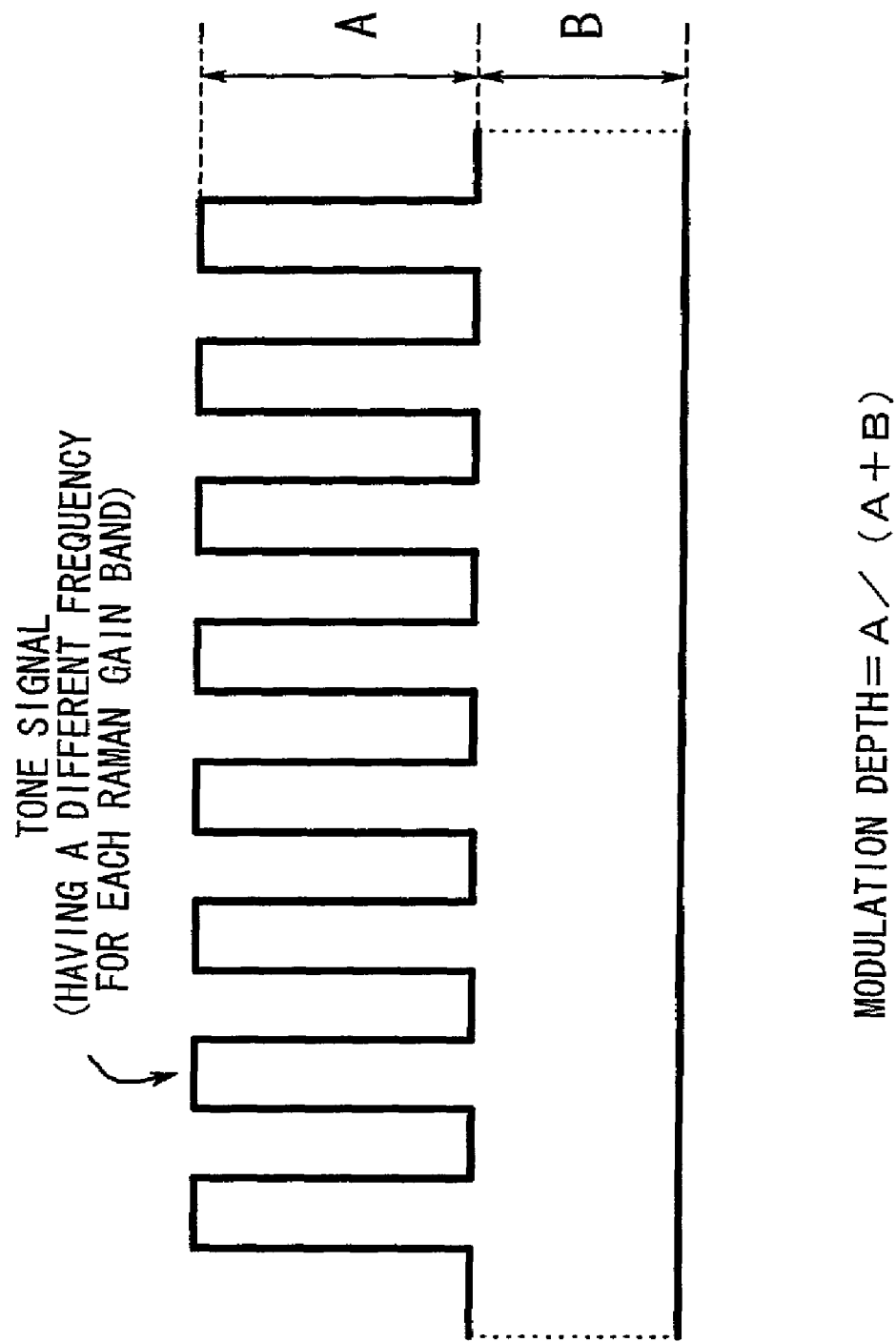
FIG. 8 is a diagram illustrating an example of a tone signal having a certain modulation depth.

FIG. 8 is a diagram illustrating an example of a tone signal having a certain modulation depth.

In order to transmit a tone signal together with an optical signal, the tone-signal generation unit 12 in the optical terminal 10 superimposes the tone signal on the optical signal as illustrated in FIG. 8 so as to generate an amplitude-modulated signal.

When the optical signal has an amplitude B, and the tone signal component of the amplitude-modulated signal has a zero-to-peak amplitude A, the modulation depth is defined as A/(A+B). In this case, the tone-signal generation unit 12 generates the tone signal component for each Raman gain band so as to have a different frequency.

Figure 9:
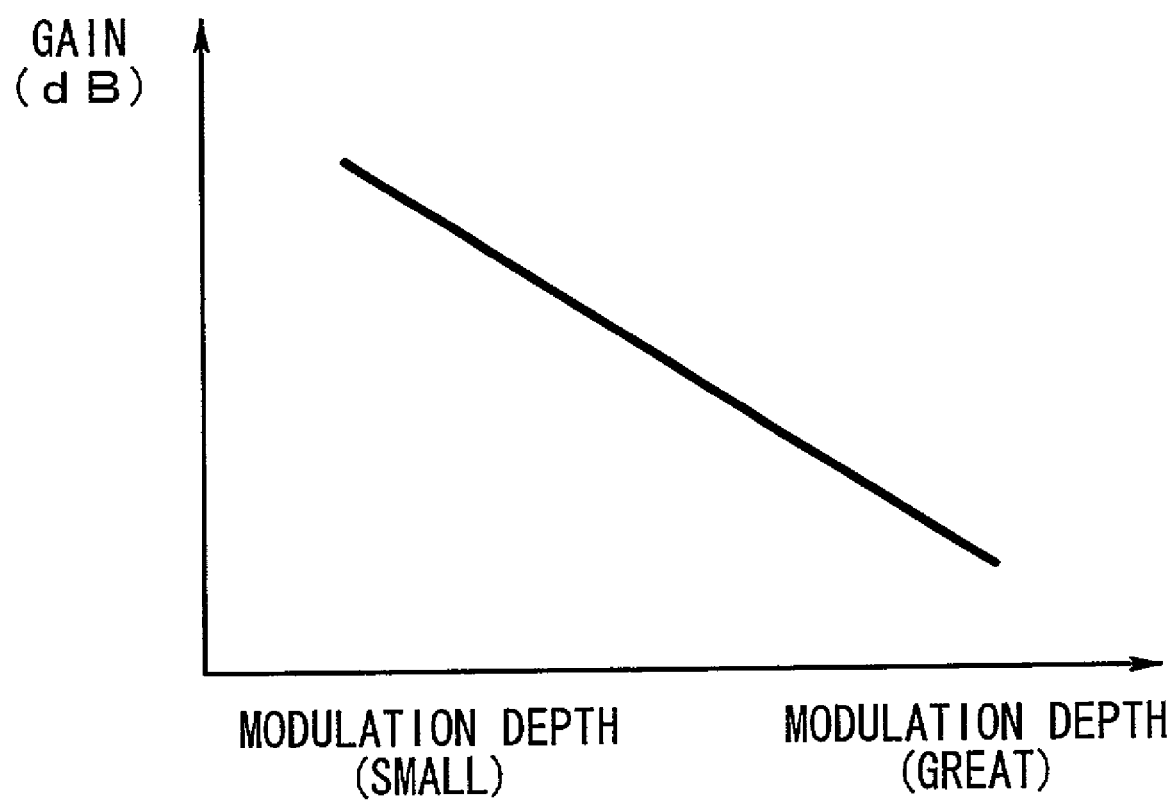
FIG. 9 is a graph illustrating an example of a relationship between a modulation depth of a tone signal for a Raman gain band and a gain in the Raman gain band controlled by an optical repeater.

FIG. 9 is a graph illustrating an example of a relationship between the modulation depth of the tone signal for a Raman gain band and a gain in the Raman gain band controlled by an optical repeater. In FIG. 9, the abscissa corresponds to the modulation depth of the tone signal, and the ordinate corresponds to the gain in the optical repeater. As illustrated in FIG. 9, the gain in the optical repeater is controlled so that the gain increases with decrease in the modulation depth.

In order to increase the gain in the Raman gain band G1, the tone-signal generation unit 12 in the optical terminal 10 decreases the amplitude A illustrated in FIG. 8 so as to decrease the modulation depth of the tone signal T1. In the optical repeater 20, the filter F1 extracts the tone signal T1, and the smoothing unit 22a-1 smoothes the tone signal T1 so as to generate a decreased DC voltage d1. Then, the gain control unit 23-1 compares the decreased DC voltage d1 with the reference voltage. In this case, the gain control unit 23-1 generates a driving current cnt1 which increases the power of the excitation light emitted from the excitation light source LD1. That is, based on the driving current cnt1, the excitation light source LD1 emits such excitation light as to increase the gain in the Raman gain band G1.

On the other hand, in order to decrease the gain in the Raman gain band G1, the tone-signal generation unit 12 in the optical terminal 10 increases the amplitude A illustrated in FIG. 8 so as to increase the modulation depth of the tone signal T1. In the optical repeater 20, the filter F1 extracts the tone signal T1, and the smoothing unit 22a-1 smoothes the tone signal T1 so as to generate an increased DC voltage d1. Then, the gain control unit 23-1 compares the increased DC voltage d1 with the reference voltage. In this case, the gain control unit 23-1 generates a driving current cnt1 which decreases the power of the excitation light emitted from the excitation light source LD1. That is, based on the driving current cnt1, the excitation light source LD1 emits such excitation light as to decrease the gain in the Raman gain band G1.

Figure 10:
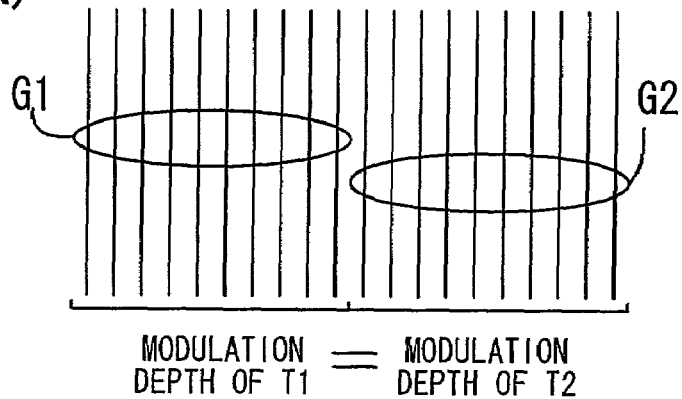
FIG. 10(A) is a diagram illustrating examples of gains in the gain bands G1 and G2 in the case where the modulation depths of the tone signals in the gain bands G1 and G2 are equal.
FIG. 10(B) is a diagram illustrating examples of gains in the gain bands G1 and G2 in the case where the modulation depth of the tone signal in the gain band G1 is smaller than the modulation depth of the tone signal in the gain band G2.
FIG. 10(C) is a diagram illustrating examples of gains in the gain bands G1 and G2 in the case where the modulation depth of the tone signal in the gain band G1 is greater than the modulation depth of the tone signal in the gain band G2.
Figure 10:
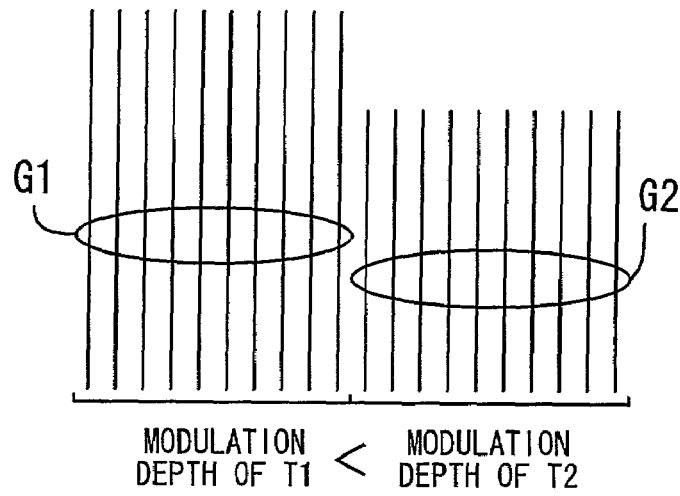
Figure 10:
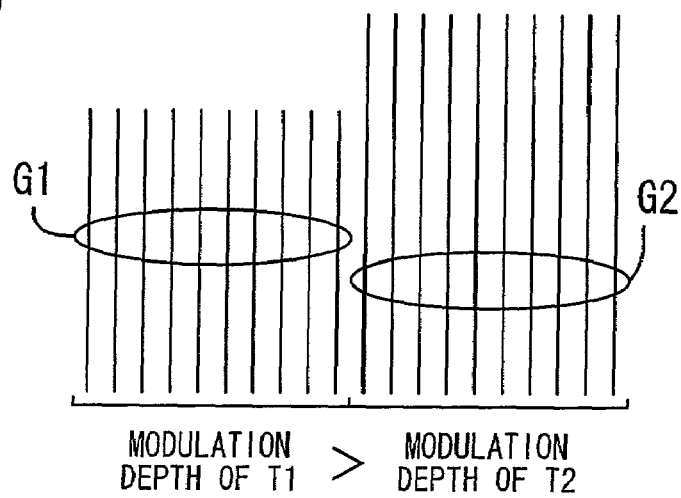

FIG. 10(A) is a diagram illustrating examples of gains in the gain bands G1 and G2 in the case where the modulation depths of the tone signals in the gain bands G1 and G2 are equal. As illustrated in FIG. 10(A), when the tone signals T1 and T2 have an identical modulation depth, the gains in the Raman gain bands G1 and G2 become identical.

FIG. 10(B) is a diagram illustrating examples of gains in the gain bands G1 and G2 in the case where the modulation depth of the tone signal in the gain band G1 is smaller than the modulation depth of the tone signal in the gain band G2. As illustrated in FIG. 10(B), when the modulation depth of the tone signal T1 in the gain band G1 is smaller than the modulation depth of the tone signal T2 in the gain band G2, the gain in the Raman gain band G1 becomes greater than the gain in the Raman gain band G2.

FIG. 10(C) is a diagram illustrating examples of gains in the gain bands G1 and G2 in the case where the modulation depth of the tone signal in the gain band G1 is greater than the modulation depth of the tone signal in the gain band G2. As illustrated in FIG. 10(C), when the modulation depth of the tone signal T1 in the gain band G1 is greater than the modulation depth of the tone signal T2 in the gain band G2, the gain in the Raman gain band G1 becomes smaller than the gain in the Raman gain band G2.

Next, the gain control based on the frequency of the tone signal is explained.

Figure 11:
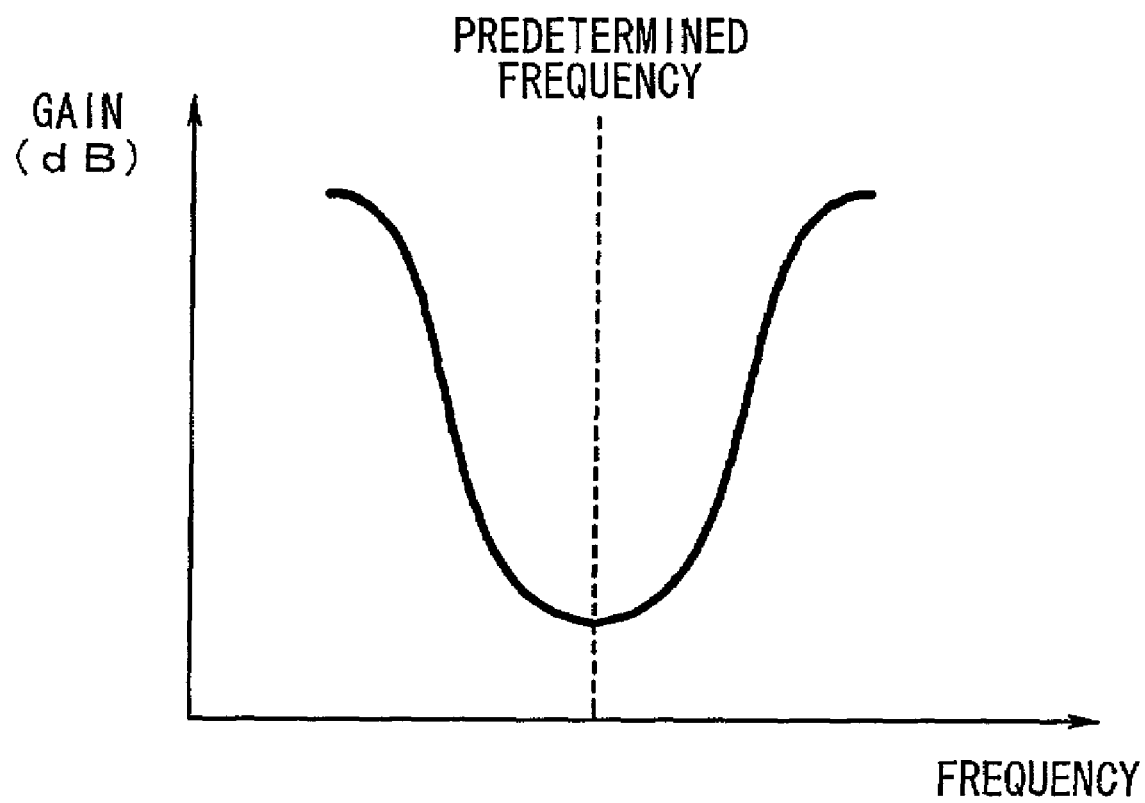
FIG. 11 is a graph illustrating an example of a relationship between a frequency of a tone signal for a Raman gain band and a gain in the Raman gain band controlled by an optical repeater.

FIG. 11 is a graph illustrating an example of a relationship between the frequency of a tone signal for a Raman gain band and the gain in the Raman gain band controlled by an optical repeater. In FIG. 11, the abscissa corresponds to the frequency of the tone signal, and the ordinate corresponds to the gain in the optical repeater. As illustrated in FIG. 11, the gain in the optical repeater is controlled so that the gain increases with increase in the difference between the frequency of the tone signal and a predetermined frequency f1. For example, the predetermined frequency f1 is a center frequency of the filter F1 or F2 which is provided corresponding to the Raman gain band in the optical repeater 20.

In order to increase the gain in the Raman gain band G1, the tone-signal generation unit 12 in the optical terminal 10 increases the difference between the frequency of the tone signal and the predetermined frequency f1. In the optical repeater 20, the filter F1 extracts the tone signal T1. When the difference between the frequency of the tone signal and the predetermined frequency f1 is great, the filter loss in the filter F1 becomes great since the predetermined frequency f1 is the center frequency of the filter F1. Therefore, in this case, the level of the DC voltage d1, which is output from the smoothing unit 22a-1 becomes low. Then, the gain control unit 23-1 compares the decreased DC voltage d1 with the reference voltage. When the decreased DC voltage d1 is lower than the reference voltage, the gain control unit 23-1 generates a driving current cnt1 which increases the power of the excitation light emitted from the excitation light source LD1. That is, based on the driving current cnt1, the excitation light source LD1 emits such excitation light as to increase the gain in the Raman gain band G1.

On the other hand, in order to decrease the gain in the Raman gain band G1, the tone-signal generation unit 12 in the optical terminal 10 decreases the difference between the frequency of the tone signal and the predetermined frequency f1. In the optical repeater 20, the filter F1 extracts the tone signal T1. When the difference between the frequency of the tone signal and the predetermined frequency f1 is small, the filter loss in the filter F1 is small. Therefore, in this case, the level of the DC voltage d1, which is output from the smoothing unit 22a-1 becomes high. Then, the gain control unit 23-1 compares the decreased DC voltage d1 with the reference voltage. When the decreased DC voltage d1 is higher than the reference voltage, the gain control unit 23-1 generates a driving current cnt1 which decreases the power of the excitation light emitted from the excitation light source LD1. That is, based on the driving current cnt1, the excitation light source LD1 emits such excitation light as to decrease the gain in the Raman gain band G1.

Figure 12:
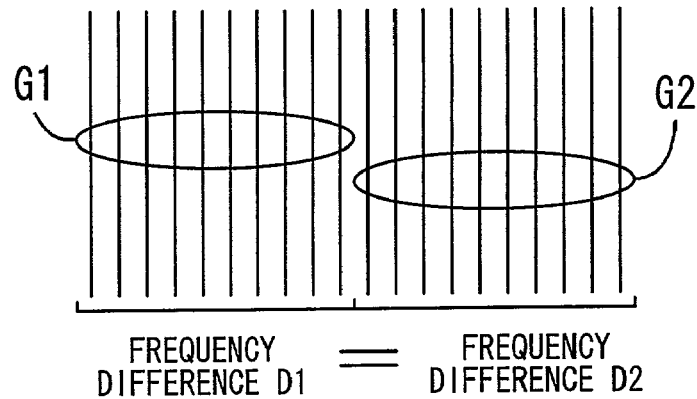
FIG. 12(A) is a diagram illustrating examples of gains in the gain bands G1 and G2 in the case where the frequency differences in the gain bands G1 and G2 are equal.
FIG. 12(B) is a diagram illustrating examples of gains in the gain bands G1 and G2 in the case where the frequency difference in the gain band G1 is greater than the frequency difference in the gain band G2.
FIG. 12(C) is a diagram illustrating examples of gains in the gain bands G1 and G2 in the case where the frequency difference in the gain band G1 is smaller than the frequency difference in the gain band G2.
Figure 12:
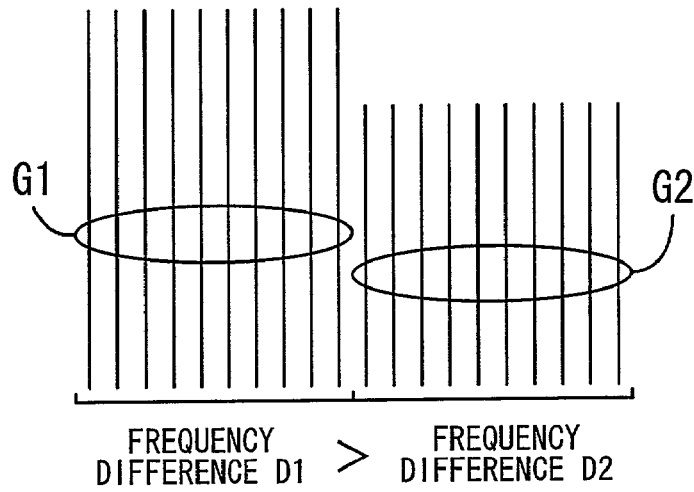
Figure 12:
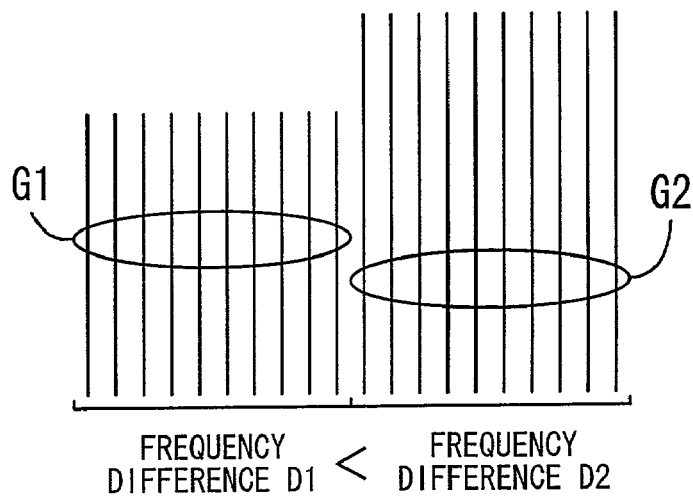

FIG. 12(A) is a diagram illustrating examples of the gains in the gain bands G1 and G2 in the case where the frequency differences in the gain bands G1 and G2 are equal; FIG. 12(B) is a diagram illustrating examples of the gains in the gain bands G1 and G2 in the case where the frequency difference in the gain band G1 is greater than the frequency difference in the gain band G2; and FIG. 12(C) is a diagram illustrating examples of the gains in the gain bands G1 and G2 in the case where the frequency difference in the gain band G1 is smaller than the frequency difference in the gain band G2, where each frequency difference is a difference between a frequency of a tone signal for a gain band and a predetermined frequency for the gain band. In FIGS. 12(A) to 12(C), the difference between the frequency of the tone signal T1 and the predetermined frequency f1 for the gain band G1 is denoted by D1, and the difference between the frequency of the tone signal T2 and a predetermined frequency f2 for the gain band G2 is denoted by G2.

As illustrated in FIG. 12(A), when the tone signals T1 and T2 have an identical frequency, the gains in the Raman gain bands G1 and G2 become identical. As illustrated in FIG. 12(B), when the difference D1 between the frequency of the tone signal T1 and the predetermined frequency f1 is greater than the difference D2 between the frequency of the tone signal T2 and the predetermined frequency f2, the gain in the Raman gain band G1 becomes greater than the gain in the Raman gain band G2. As illustrated in FIG. 12(C), when the difference D1 between the frequency of the tone signal T1 and the predetermined frequency f1 is smaller than the difference D2 between the frequency of the tone signal T2 and the predetermined frequency f2, the gain in the Raman gain band G1 becomes smaller than the gain in the Raman gain band G2.

Figure 13:
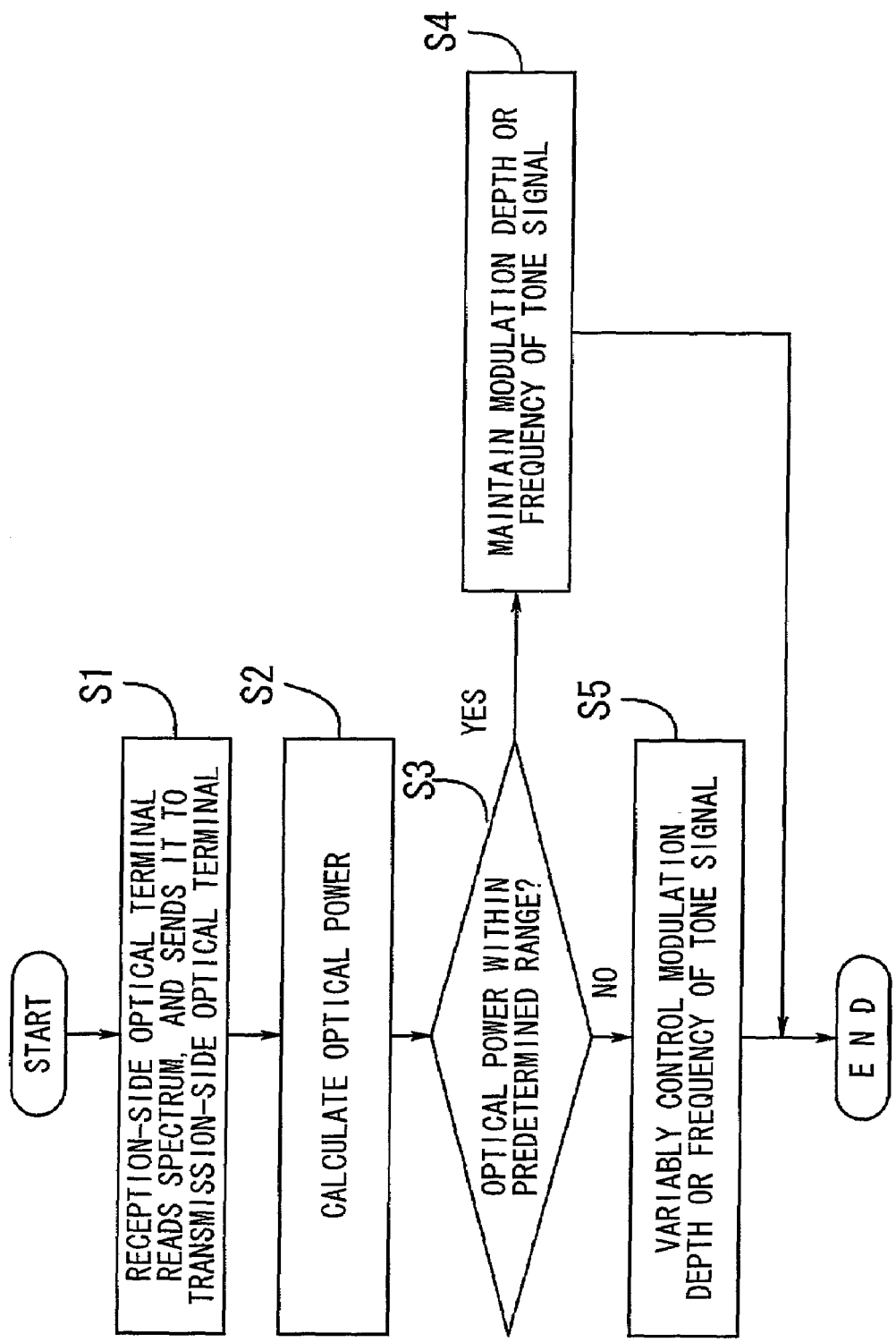
FIG. 13 is a flow diagram illustrating a sequence of operations performed by an optical terminal.

The operations of the transmission-side optical terminal 10 and the reception-side optical terminal are explained below with reference to FIG. 13, which is a flow diagram illustrating a sequence of operations performed by the transmission-side optical terminal 10 and the reception-side optical terminal.

In step S1, the reception-side optical terminal receives optical signals together with a tone signal from the transmission-side optical terminal 10 through the upstream optical-fiber transmission line, reads the spectrum of the optical signals, and transmits the spectrum of the optical signals as the aforementioned state information to the transmission-side optical terminal 10.

In step S2, the optical-signal-power detection unit 11 in the transmission-side optical terminal 10 calculates average power of the optical signals for each Raman gain band based on the spectrum of the optical signals which is transmitted from the reception-side optical terminal.

In step S3, the optical-signal-power detection unit 11 in the transmission-side optical terminal 10 determines whether or not the calculated average power of the optical signals for each Raman gain band is within a predetermined range. When yes is determined in step S3, the operation goes to step S4. When no is determined in step S3, the operation goes to step S5.

In step S4, the tone-signal generation unit 12 in the transmission-side optical terminal 10 maintains the current modulation depth or frequency of the tone signal for the Raman gain band.

In step S5, when it is necessary to increase the gain in the Raman gain band, the tone-signal generation unit 12 in the transmission-side optical terminal 10 decreases the modulation depth of the tone signal for the Raman gain band or increases the difference between the frequency of the tone signal and the predetermined frequency. On the other hand, when it is necessary to decrease the gain in the Raman gain band, the tone-signal generation unit 12 in the transmission-side optical terminal 10 increases the modulation depth of the tone signal for the Raman gain band or decreases the difference between the frequency of the tone signal and the predetermined frequency.

As explained above, according to the present invention, the optical terminal 10 varies the modulation depth of a tone signal for each Raman gain band which is transmitted from the optical terminal 10, or the difference between the frequency of the tone signal and the predetermined frequency, based on the power of optical signals transmitted from the optical terminal 10 in the Raman gain band. Then, the optical repeater 20 controls the output power of the excitation light so as to increase or decrease the gain for each Raman gain band according to the modulation depth or frequency of the tone signal for the Raman gain band. Therefore, it is possible to flexibly vary the gain in optical amplification in each Raman gain band according to the power of optical signals transmitted from the optical terminal in the Raman gain band. Thus, it is possible to reduce imbalance in the gain between Raman gain bands, suppress deterioration of transmission characteristics, and realize high-quality optical transmission.

Next, the other examples of the optical repeater 20 are described in the second embodiment to the fourth embodiments.

(4) Optical Repeater in Second Embodiment

Figure 14:
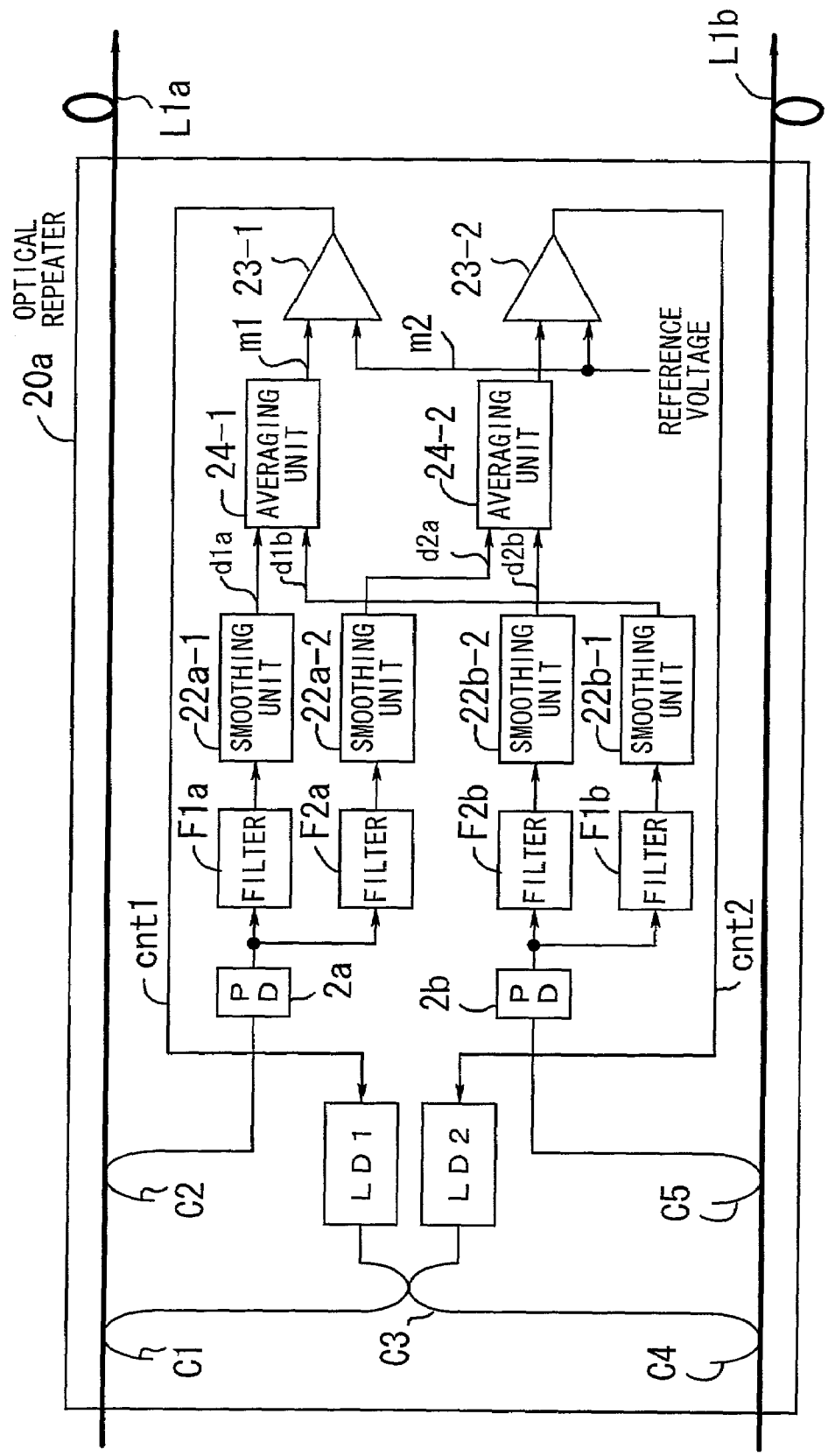
FIG. 14 is a diagram illustrating an example of an optical repeater in a second embodiment of the present invention.

FIG. 14 is a diagram illustrating an example of the optical repeater in the second embodiment of the present invention. In the second embodiment, the optical repeater 20a of FIG. 14 is used instead of the optical repeater 20 of FIG. 7. In FIG. 14, elements having the same functions as the elements in the optical repeater of FIG. 7 bear the same reference numerals as FIG. 7, respectively.

The optical repeater 20a of FIG. 14 is arranged to concurrently realize Raman excitation in both of two upstream transmission lines L1a and L1b.

The optical repeater of FIG. 14 comprises, on the side of the upstream transmission line L1a, optical couplers C1 and C2, a photodiode 2a, filters F1a and F2a, and smoothing units 22a-1 and 22a-2. In addition, the optical repeater 20a of FIG. 14 comprises, on the side of the upstream transmission line L1b, optical couplers C4 and C5, a photodiode 2b, filters F1b and F2b, and smoothing units 22b-1 and 22b-2. Further, the optical repeater 20a of FIG. 14 comprises averaging units 24-1 and 24-2, gain control units 23-1 and 23-2, excitation light sources LD1 and LD2, and an optical coupler C3.

A first tone signal T1 transmitted through the upstream transmission line L1a in the Raman gain band G1 is extracted by the filter F1a, and a first DC voltage d1a is generated by the smoothing unit 22a-1. A second tone signal T2 transmitted through the upstream transmission line L1a in the Raman gain band G2 is extracted by the filter F2a, and a second DC voltage d2a is generated by the smoothing unit 22a-2. A third tone signal T1 transmitted through the upstream transmission line L1b in the Raman gain band G1 is extracted by the filter F1b, and a third DC voltage d1b is generated by the smoothing unit 22b-1. A fourth tone signal T2 transmitted through the upstream transmission line L1b in the Raman gain band G2 is extracted by the filter F2b, and a fourth DC voltage d2b is generated by the smoothing unit 22b-2.

The excitation light sources LD1 and LD2 are provided for Raman amplification in the Raman gain bands G1 and G2, respectively.

The operation for controlling Raman amplification in the Raman gain band G1 is explained below.

First optical signals transmitted from the optical terminal 10 through the upstream transmission line L1a are branched through the optical coupler C2 from the upstream transmission line L1a and received by the photodiode 2a, and second optical signals transmitted from the optical terminal 10 through the upstream transmission line L1b are branched through the optical coupler C5 from the upstream transmission line L1b and received by the photodiode 2b.

The photodiode 2a converts the first optical signals into a first electric signal. The filter F1a passes the frequency of the first tone signal T1, and the signal component which has passed through the filter F1a is smoothed by the smoothing unit 22a-1 so as to generate the first DC voltage d1a as a first characteristic signal. In addition, the photodiode 2b converts the second optical signals into a second electric signal. The filter F1b passes the frequency of the third tone signal T1, and the signal component which has passed through the filter F1b is smoothed by the smoothing unit 22b-1 so as to generate a second DC voltage d1b as a second characteristic signal.

The averaging unit 24-1 obtains an average of the first and second DC voltages d1a and d1b, and outputs an average voltage m1 as an averaged signal.

The gain control unit 23-1 compares the average voltage m1 with a reference voltage, and outputs a driving current as the aforementioned control signal cnt1 based on the result of the comparison, where the driving current cnt1 drives the excitation light source LD1, and therefore the gain in the Roman gain band G1 can be varied according to the driving current cnt1.

The excitation light source LD1 emits excitation light according to the driving current cnt1. The excitation light emitted from the excitation light source LD1 is split by the optical coupler C3 into two beams, and the two beams of the excitation light are injected into the upstream transmission line L1a and the upstream transmission line L1b through the optical couplers C1 and C4, respectively. Thus, backward Raman pumping is realized in the upstream transmission line L1a and the upstream transmission line L1b, and the gain in the Raman gain band G1 in each of the upstream transmission lines L1a and L1b can be varied according to the driving current cnt1.

The operation for controlling Raman amplification in the Raman gain band G2 is performed in a similar manner to the above operation for controlling Raman amplification in the Raman gain band G1.

(5) Optical Repeater in Third Embodiment

Figure 15:
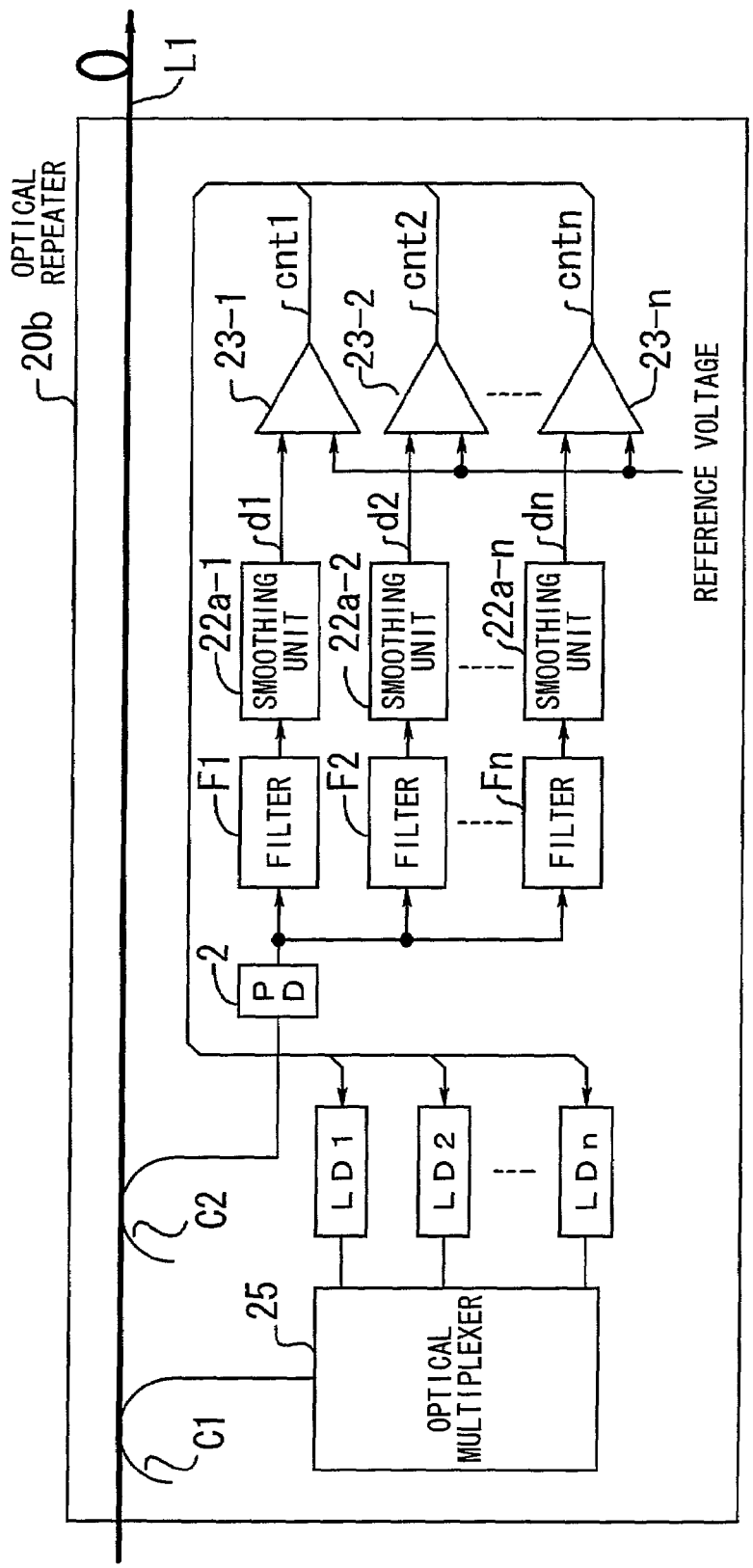
FIG. 15 is a diagram illustrating an example of an optical repeater in a third embodiment of the present invention.

FIG. 15 is a diagram illustrating an example of an optical repeater in the third embodiment of the present invention. In the third embodiment, the optical repeater 20b of FIG. 15 is used instead of the optical repeater 20 of FIG. 7. In FIG. 15, elements having the same functions as the elements in the optical repeater of FIG. 7 bear the same reference numerals as FIG. 7, respectively.

The optical repeater 20b of FIG. 15 is arranged to realize Raman amplification in more than two Raman gain bands.

The optical repeater 20b of FIG. 15 comprises optical couplers C1 and C2, a photodiode 2, n filters F1 to Fn, n smoothing units 22a-1 to 22a-n, n gain control units 23-1 to 23-n, n excitation light sources LD1 to LDn, and an optical multiplexer 25, where n is an integer greater than two. The filter F1, the smoothing unit 22a-i, the gain control unit 23-i, and the excitation light source LDi are provided corresponding to a Raman gain band Gi, where i is an integer satisfying $0<i^2n$. That is, the excitation light sources LD1 to LDn are provided for Raman amplification in the Raman gain bands G1 to Gn, respectively.

The optical multiplexer 25 optically multiplexes the excitation light emitted from the excitation light sources LD1 to LDn, and injects the multiplexed excitation light into the upstream transmission line L1 through the optical coupler C1. Thus, backward Raman pumping is realized in the Raman gain bands G1 to Gn in the upstream transmission line L1.

(6) Optical Repeater in Fourth Embodiment

Figure 16:
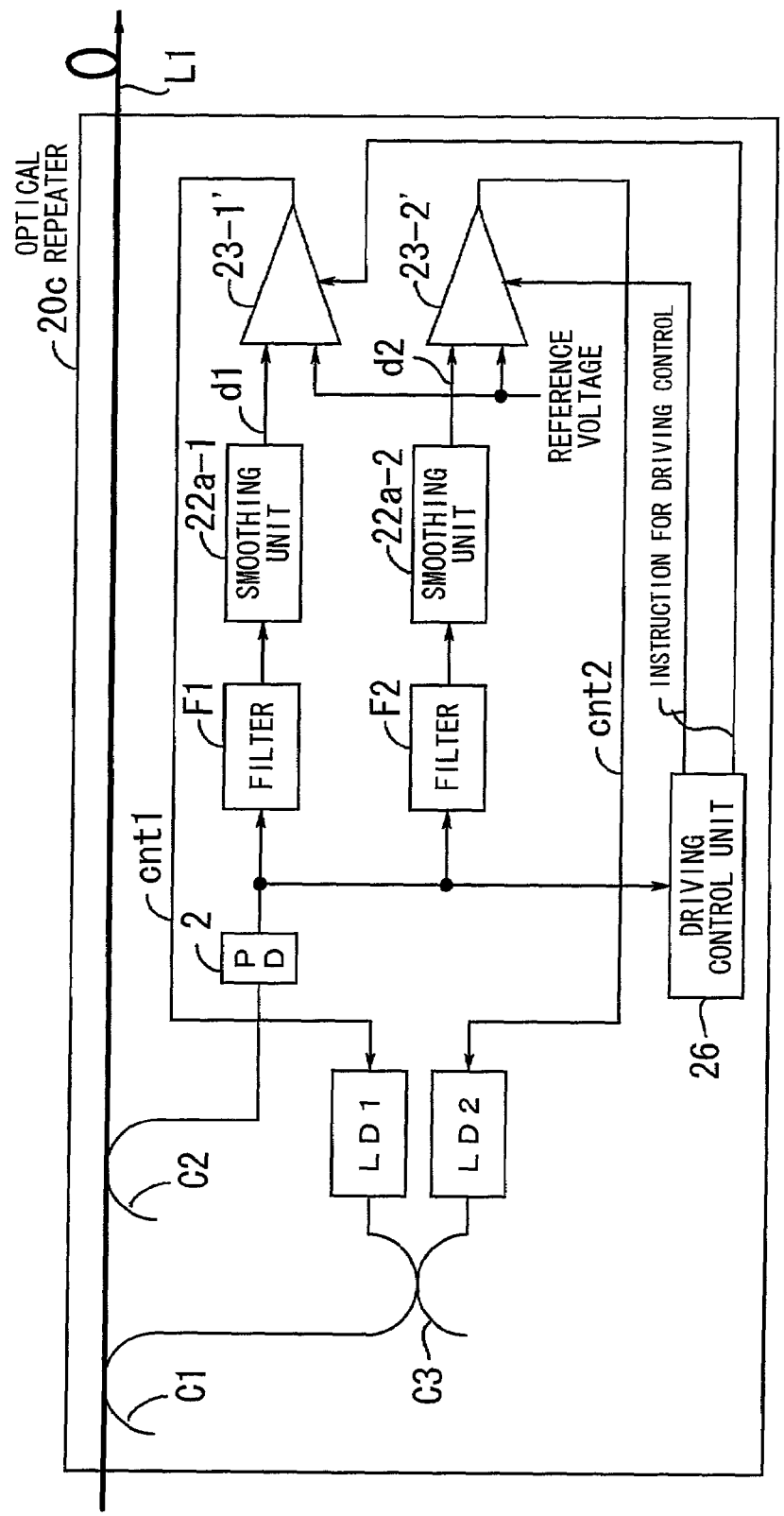
FIG. 16 is a diagram illustrating an example of an optical repeater in a fourth embodiment of the present invention.

FIG. 16 is a diagram illustrating an example of an optical repeater in the fourth embodiment of the present invention. In the fourth embodiment, the optical repeater 20c of FIG. 16 is used instead of the optical repeater 20 of FIG. 7. In the optical repeater of FIG. 16, elements having the same functions as the elements in the optical repeater of FIG. 7 bear the same reference numerals as FIG. 7, respectively.

The optical repeater 20c of FIG. 16 is different from the optical repeater 20 of FIG. 7 in that a driving control unit 26 is provided, and gain control units 23-1' and 23-2' can be on/off controlled so that the corresponding excitation light sources LD1 and LD2 are on/off controlled. The gain control units 23-1' and 23-2' respectively have the same functions as the gain control units 23-1 and 23-2 in FIG. 7 except that gain control units 23-1' and 23-2' can be on/off controlled.

For example, when only the Raman gain band G1 is used for transmission of service signals, it is not necessary to activate the excitation light source LD2 for the Raman gain band G2. In this case, the optical terminal 10 transmits an optical signal carrying driving information to the optical repeater 20c, where the driving information contains an instruction to activate only the excitation light source LD1. In the optical repeater 20c, the optical signal carrying the driving information is branched through the optical coupler C2 from the upstream transmission line L1, and received by the photodiode 2. The received optical signal is converted into an electric signal carrying the driving information, and the electric signal is supplied to the driving control unit 26.

When the driving control unit 26 receives the electric signal, and detects the driving information, the optical multiplexer 25 sends an instruction to activate the excitation light source LD1 to the gain control unit 23-1', and another instruction to deactivate the excitation light source LD2 to the gain control unit 23-2'. Thus, the gain control unit 23-1' activates the excitation light source LD1 by supplying a driving current to the excitation light source LD1, and the gain control unit 23-2' deactivates the excitation light source LD2 by stopping supply of a driving current to the excitation light source LD2.

When the excitation light sources LD1 and LD2 are on/off controlled as above, the optical transmission using optical repeaters can be performed further efficiently.

(7) Another Optical Transmission System

Figure 17:
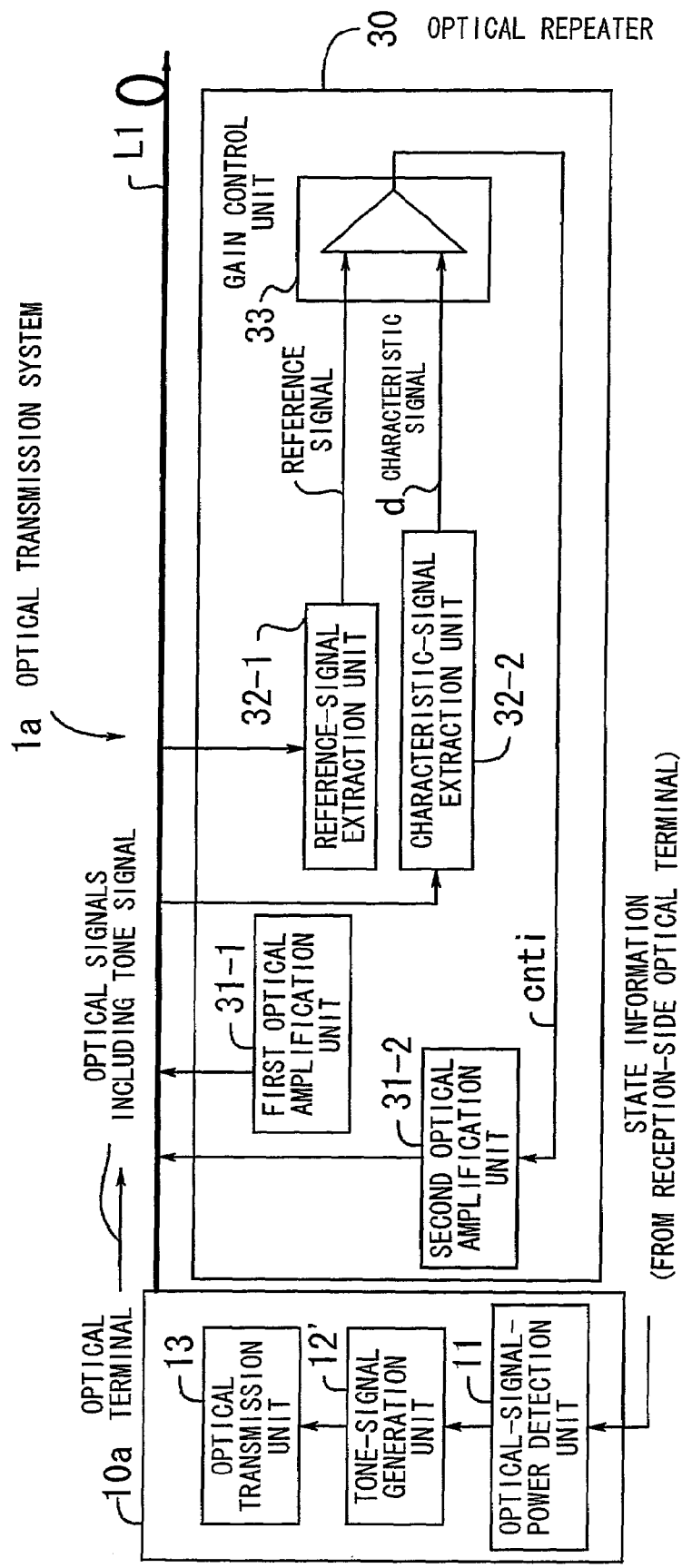
FIG. 17 is a diagram illustrating a construction of another optical transmission system according to the present invention.

FIG. 17 is a diagram illustrating a construction of another optical transmission system.

The optical transmission system 1a of FIG. 17 also comprises a pair of optical terminals and a plurality of optical repeaters, although only one of the pair of optical terminals 10a and only one of the plurality of optical repeaters 30 are illustrated in FIG. 17. In the optical transmission system 1a of FIG. 17, the pair of optical terminals are connected with an optical-fiber transmission line L1, and the plurality of optical repeaters are arranged along the optical-fiber transmission line L1 for realizing long-distance optical transmission. In the following explanations, the same features as the optical transmission system 1 of FIG. 1 are not repeated.

Although the reference signal in the optical transmission system 1a is preset in each optical repeater 20, the reference signal used in each optical repeater 30 is set by the transmission-side optical terminal 10a in a manner described below.

Here, in the optical transmission system 1, the gain in each of the Roman gain bands is variably controlled to the reference signal which is determined in the optical repeater.

The tone-signal generation unit 12' in the transmission-side optical terminal 10a generates a reference tone signal in a specific gain band, and generates a tone signal in each of the plurality of gain bands except for the specific gain band, where the frequencies of the reference tone signal and the other tone signal (or tone signals) are different from each other. At this time, the reference tone signal is generated so that a desired reference signal can be produced by the optical repeater 30 based on the reference tone signal. In addition, the tone-signal generation unit 12' can change a characteristic (e.g., a modulation depth or the frequency) of the reference tone signal or each tone signal according to the power of the at least one optical signal so that gains in the plurality of gain bands are equalized. For example, the specific gain band is the Raman gain band G1.

The optical transmission unit 13 transmits the reference tone signal in the specific gain band, and the other tone signal (or tone signals) together with other optical signals including service signals in the other gain band (or gain bands).

Each optical repeater 30 comprises a first optical amplification unit 31-1, a second optical amplification unit 31-2, a reference-signal extraction unit 32-1, a characteristic-signal extraction unit 32-2, and a gain control unit 33.

The first optical amplification unit 31-1 realizes optical amplification in a specific gain band in which a reference tone signal is transmitted from the optical repeater 10a to the optical repeater 30, with constant light emission.

The second optical amplification unit 31-2 is provided corresponding to each gain band i except for the specific gain band, and realizes optical amplification with a gain determined based on a control signal cnti which is generated by the gain control unit 33 corresponding to each gain band i except for the specific gain band.

The reference-signal extraction unit 32-1 extracts the reference tone signal transmitted from the optical terminal 10 in said specific gain band, and generates the reference signal. The characteristic-signal extraction unit 32-2 is provided corresponding to each gain band i except for the specific gain band, and extracts a tone signal transmitted from the optical terminal 10 in the gain band i, and generates a characteristic signal di corresponding to the gain band i based on the extracted tone signal, where the characteristic signal di represents a characteristic of the extracted tone signal corresponding to the gain band i. The gain control unit 33 is provided corresponding to each gain band i except for the specific gain band, compares the characteristic signal di with the reference signal, and generates the control signal cnti which is used by the second optical amplification unit 31-2 corresponding to the gain band i for variable control of the gain in the gain band i so that the gains in the plurality of gain bands are equalized.

(8) Optical Repeater in Fifth Embodiment

Figure 18:
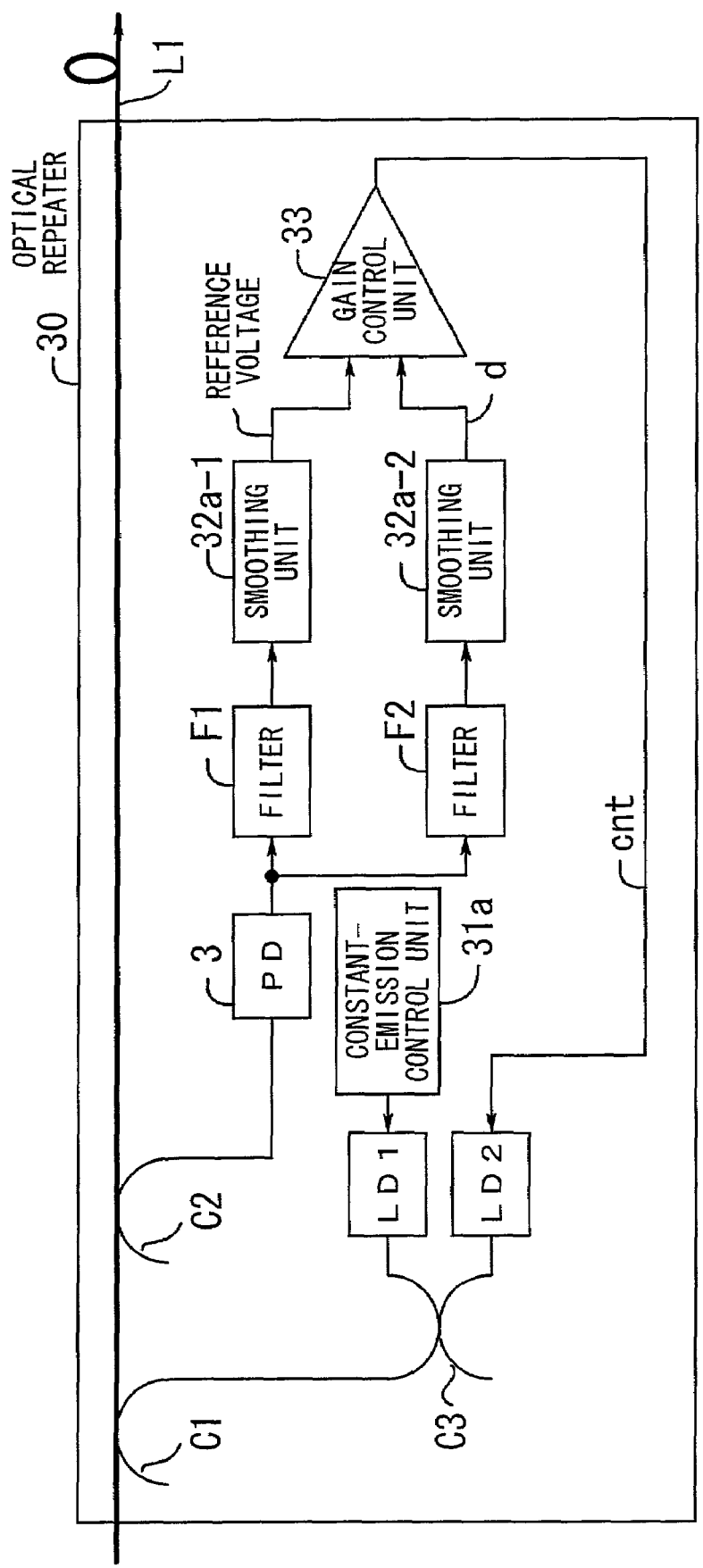
FIG. 18 is a diagram illustrating an example of an optical repeater in a fifth embodiment of the present invention.

FIG. 18 is a diagram illustrating an example of the optical repeater 30 which is used in the optical transmission system of FIG. 17 in a fifth embodiment of the present invention. In FIG. 18, elements having the same functions as the elements in the optical repeater of FIG. 7 bear the same reference numerals as FIG. 7, respectively.

The optical repeater 30 of FIG. 18 comprises optical couplers C1 to C3, a photodiode 3, filters F1 and F2, a constant-emission control unit 31a, smoothing units 32a-1 and 32a-2, a gain control unit 33, and excitation light sources LD1 and LD2.

The excitation light sources LD1 and LD2 are provided for Raman amplification in the Raman gain bands G1 and G2, respectively. In the example of FIG. 18, the aforementioned specific gain band is the Raman gain band G1. Therefore, a tone signal T1 transmitted from the transmission-side optical terminal 10a to the optical repeater 30 in the Raman gain band G1 is the aforementioned reference tone signal.

The smoothing units 32a-1 and 32a-2 have the same functions as the smoothing units 22a-1 and 22a-2 in FIG. 7, and the gain control unit 33 has the same function as the gain control unit 23-2 in FIG. 7.

When the tone signal T1 transmitted from the transmission-side optical terminal 10a to the optical repeater 30 in the Raman gain band G1 is the aforementioned reference tone signal, the constant-emission control unit 31a controls (outputs a driving current to) the excitation light source LD1 so that the excitation light source LD1 emits excitation light with constant power. Under this condition, the DC voltage d1 output from the smoothing unit 32a-1 is used as the reference signal by the gain control unit 33, and the gain in the Raman gain band G2 is variably controlled based on the reference signal. That is, the gain in the Raman gain band G2 is controlled so as to equalize the gain in the Raman gain band G2 with the gain in the Raman gain band G1.

(9) Optical Repeater in Sixth Embodiment

Figure 19:
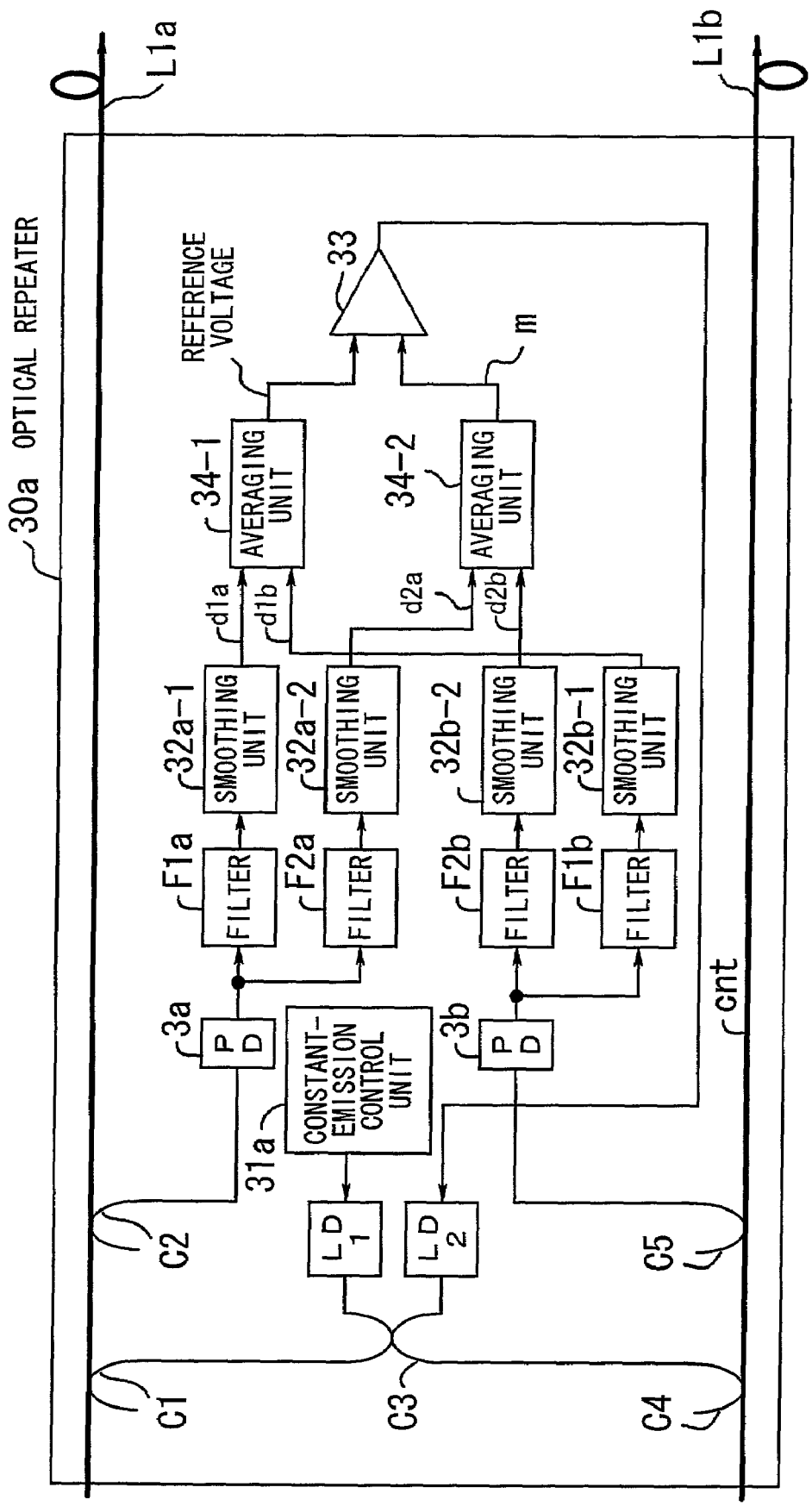
FIG. 19 is a diagram illustrating an example of an optical repeater in a sixth embodiment of the present invention.

FIG. 19 is a diagram illustrating an example of an optical repeater in the sixth embodiment of the present invention. In the sixth embodiment, The optical repeater 30a of FIG. 19 is used instead of the optical repeater 30 of FIG. 18. The optical repeater 30a of FIG. 19 is arranged to concurrently realize Raman excitation in both of two upstream transmission lines L1a and L1b, and has a construction partially similar to the construction of the optical repeater 20a in FIG. 14. In FIG. 19, elements having the same functions as the elements in the optical repeaters of FIGS. 14 and 18 bear the same reference numerals as FIGS. 14 and 18, respectively.

The optical repeater 30a of FIG. 19 comprises, on the side of the upstream transmission line L1a, optical couplers C1 and C2, a photodiode 3a, filters F1a and F2a, and smoothing units 32a-1 and 32a-2. In addition, the optical repeater 30a of FIG. 14 comprises, on the side of the upstream transmission line L1b, optical couplers C4 and C5, a photodiode 3b, filters F1b and F2b, and smoothing units 32b-1 and 32b-2. Further, the optical repeater 30a of FIG. 19 comprises averaging units 34-1 and 34-2, a gain control unit 33, excitation light sources LD1 and LD2, and an optical coupler C3. The photodiodes 3a and 3b and the smoothing units 32a-1, 32a-2, 32b-1, and 32b-2 have the same functions as the photodiodes 2a and 2b and the smoothing units 22a-1, 22a-2, 22b-1, and 22b-2 in FIG. 14, respectively.

The excitation light sources LD1 and LD2 are provided for Raman amplification in the Raman gain bands G1 and G2, respectively. In the example of FIG. 19, the aforementioned specific gain band is also the Raman gain band G1. Therefore, a reference signal is generated based on tone signals T1 transmitted from the transmission-side optical terminal 10a to the optical repeater 30 through the upstream transmission lines L1a and L1b in the Raman gain band G1.

The constant-emission control unit 31a controls (outputs a driving current to) the excitation light source LD1 so that the excitation light source LD1 emits excitation light with constant power.

A first tone signal T1 transmitted through the upstream transmission line L1a in the Raman gain band G1 is extracted by the filter F1a, and a first DC voltage d1a is output from the smoothing unit 32a-1. In addition, a second tone signal T1 transmitted through the upstream transmission line L1b in the Raman gain band G1 is extracted by the filter F1b, and a second DC voltage d1b is output from the smoothing unit 32b-1. Then, an average of the first and second DC voltages d1a and d1b is obtained as an averaged reference voltage by the averaging unit 34-1, and used as the aforementioned reference signal by the gain control unit 33.

On the other hand, a third tone signal T2 transmitted through the upstream transmission line L1a is extracted by the filter F2a, and a third DC voltage d2a is output from the smoothing unit 32a-2. In addition, a fourth tone signal T2 transmitted through the upstream transmission line L1b is extracted by the filter F2b, and a fourth DC voltage d2b is output from the smoothing unit 32b-2. Then, an average voltage m of the third and fourth DC voltages d2a and d2b is obtained by the averaging unit 34-2.

The gain control unit 33 compares the average voltage m with the averaged reference voltage. Thus, the gain in the gain band G2 is controlled based on the averaged reference voltage so as to equalize the gain in the Raman gain band G2 with the gain in the Raman gain band G1.

(10) Optical Repeater in Seventh Embodiment

Figure 20:
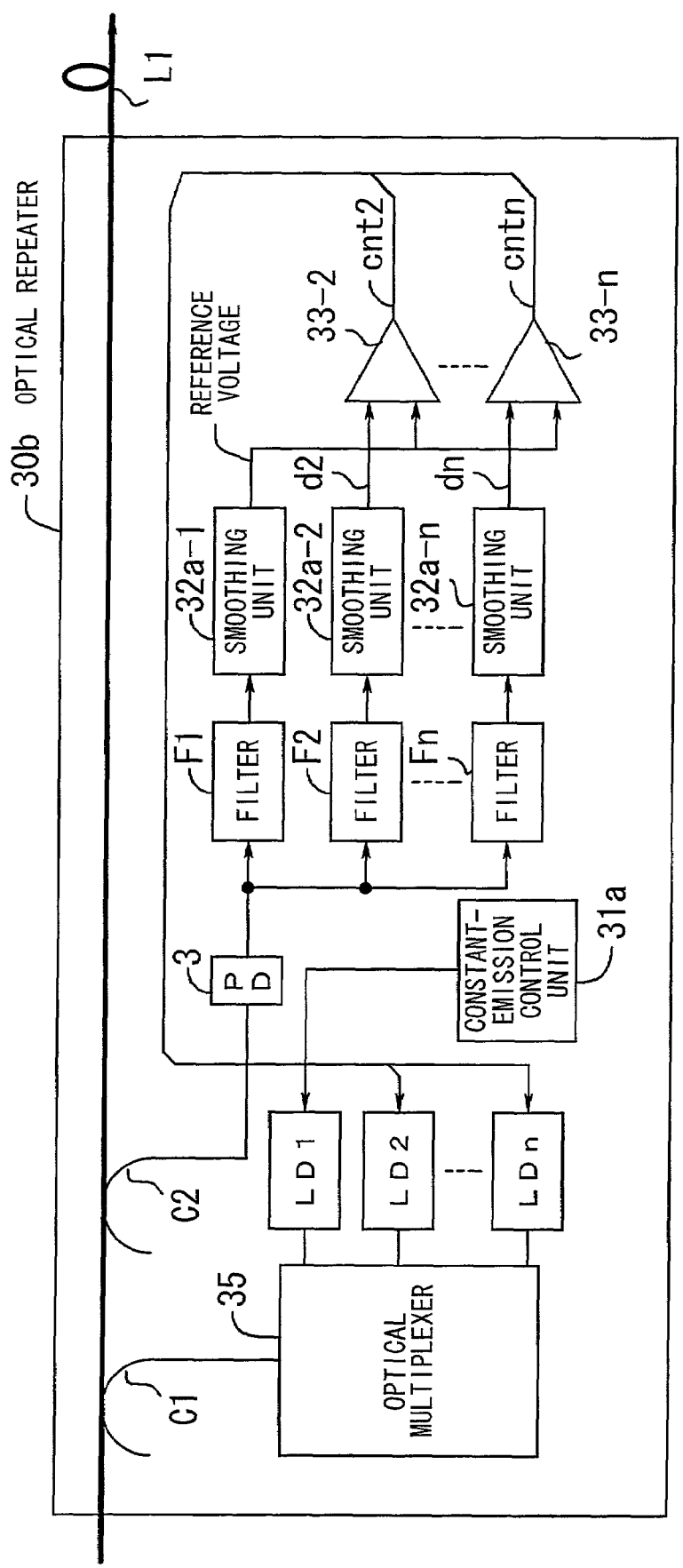
FIG. 20 is a diagram illustrating an example of an optical repeater in a seventh embodiment of the present invention.

FIG. 20 is a diagram illustrating an example of an optical repeater in the seventh embodiment of the present invention. In the seventh embodiment, the optical repeater 30b of FIG. 20 is used instead of the optical repeater 30 of FIG. 18. The optical repeater 30b of FIG. 20 is arranged to realize Raman amplification in more than two Raman gain bands, and has a construction partially similar to the construction of the optical repeater 20b in FIG. 15. In FIG. 20, elements having the same functions as the elements in the optical repeaters of FIGS. 15 and 18 bear the same reference numerals as FIGS. 15 and 18, respectively.

The optical repeater 30b of FIG. 20 comprises optical couplers C1 and C2, a photodiode 3, n filters F1 to Fn, n smoothing units 32a-1 to 32a-n, n−1 gain control units 33-2 to 33-n, n excitation light sources LD1 to LDn, and an optical multiplexer 35, where n is an integer greater than two. The filter Fi, the smoothing unit 32a-i, and the excitation light source LDi are provided corresponding to a Raman gain band Gi, where i is an integer satisfying $0<i^2n$. That is, the excitation light sources LD1 to LDn are provided for Raman amplification in the Raman gain bands G1 to Gn, respectively. In addition, the gain control units 33-2 to 33-n are provided corresponding to the Raman gain bands G2 to Gn, respectively.

The constant-emission control unit 31a controls (outputs a driving current to) the excitation light source LD1 so that the excitation light source LD1 emits excitation light with constant power. Under this condition, the DC voltage d1 output from the smoothing unit 32a-1 is used as the reference signal by the gain control units 33-2 to 33-n.

The optical multiplexer 35 optically multiplexes the excitation light emitted from the excitation light sources LD1 to LDn, and injects the multiplexed excitation light into the upstream transmission line L1 through the optical coupler C1 so that backward Raman pumping is realized in the Raman gain bands G1 to Gn in the upstream transmission line L1.

Thus, the gains in the Raman gain bands G2 to Gn are variably controlled based on the reference signal so as to equalize the gains in the Raman gain bands G2 to Gn with the gain in the Raman gain band G1.

(11) Optical Repeater in Eighth Embodiment

Figure 21:
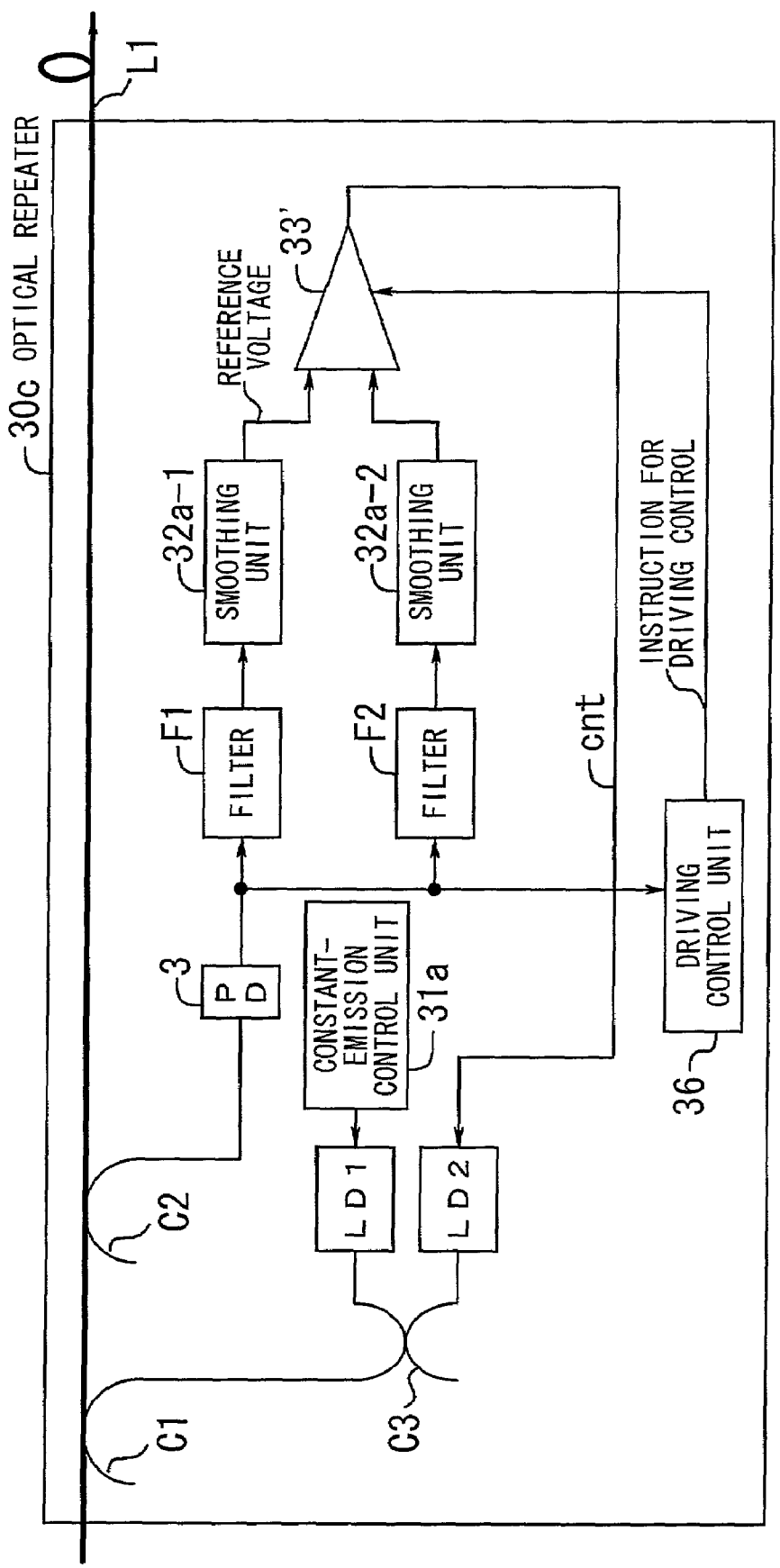
FIG. 21 is a diagram illustrating an example of an optical repeater in an eighth embodiment of the present invention.

FIG. 21 is a diagram illustrating an example of an optical repeater in the eighth embodiment of the present invention. In the eighth embodiment of the present invention, the optical repeater 30c of FIG. 21 is used instead of the optical repeater 30 of FIG. 18. The optical repeater 30c of FIG. 21 is arranged to realize Raman amplification in more than two Raman gain bands, and has a construction partially similar to the construction of the optical repeater 20c in FIG. 16. In FIG. 21, elements having the same functions as the elements in the optical repeaters of FIGS. 16 and 18 bear the same reference numerals as FIGS. 15 and 18, respectively.

The optical repeater 30c of FIG. 21 is different from the optical repeater 30 of FIG. 18 in that a driving control unit 36 is provided, and the gain control unit 33' can be on/off controlled so that the corresponding excitation light source LD2 for the Raman gain band G2 is on/off controlled.

(12) Advantages and Other Matters (i) As explained above, according to the present invention, an optical terminal transmits a plurality of tone signals corresponding to a plurality of gain bands, where the frequencies of the plurality of tone signals are different from each other, and each of the plurality of tone signals has a modulation depth or frequency which is varied according to detected power of optical signals in a gain band corresponding to the tone signal. Each optical repeater controls gains of Raman amplification in the plurality of gain bands based on the plurality of tone signals so as to equalize the gains. That is, the gains in Raman amplification in each gain band can be flexibly varied according to the power of the optical signals in the corresponding gain band. Therefore, it is possible to suppress deterioration of transmission characteristics and realize high-quality optical transmission.

(ii) The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

(iii) In addition, all of the contents of the Japanese patent application No.2001-226087 are incorporated into this specification by reference.

What is claimed is:

1. An optical transmission system comprising:
    an optical terminal;
    an optical-fiber transmission line connected to the optical terminal; and
    an optical repeater arranged along the optical-fiber transmission line;
    the optical terminal includes,
        an optical-signal power detection unit which detects power of optical signals transmitted from the optical terminal in each of a plurality of gain bands,
        a tone-signal generation unit which generates a plurality of tone signals respectively corresponding to the plurality of gain bands, where each of the plurality of tone signals has a different frequency and a characteristic corresponding to the power of optical signals in one of the plurality of gain bands corresponding to the each of the plurality of tone signals, and
        an optical transmission unit which transmits the plurality of tone signals together with optical signals through the optical-fiber transmission line,
    the optical repeater includes,
        an optical amplification unit which realizes optical amplification in each of the plurality of gain bands with a gain which is determined based on a control signal,
        a characteristic-signal generation unit which receives the plurality of tone signals, and generates a plurality of characteristic signals each representing the characteristic of one of the plurality of tone signals, and
        a gain control unit which compares each of the plurality of characteristic signals with a reference signal, and generates the control signal corresponding to each of the plurality of gain bands so as to equalize the gain in the optical amplification in each of the plurality of gain bands, and wherein the characteristic-signal generation unit includes,
            a photoelectric conversion unit which receives the plurality of tone signals, and generates an electric signal representing the plurality of tone signals, a plurality of frequency filters which respectively extract the plurality of tone signals from the electric signal, and a smoothing unit which smoothes the plurality of tone signals extracted by the plurality of frequency filters so as to generate the plurality of characteristic signals.

2. An optical transmission system, comprising:
an optical terminal;
an optical-fiber transmission line connected to the optical terminal; and
an optical repeater arranged along the optical-fiber transmission line;
the optical terminal includes,
  an optical-signal power detection unit which detects power of optical signals transmitted from the optical terminal in each of a plurality of gain bands,
  a tone-signal generation unit which generates a plurality of tone signals respectively corresponding to the plurality of gain bands, where each of the plurality of tone signals has a different frequency and a characteristic corresponding to the power of optical signals in one of the plurality of gain bands corresponding to the each of the plurality of tone signals, and
  an optical transmission unit which transmits the plurality of tone signals together with optical signals through the optical-fiber transmission line;
the optical repeater includes,
  an optical amplification unit which realizes optical amplification in each of the plurality of gain bands with a gain which is determined based on a control signal,
  a characteristic-signal generation unit which receives the plurality of tone signals, and generates a plurality of characteristic signals each representing the characteristic of one of the plurality of tone signals, and
  a gain control unit which compares each of the plurality of characteristic signals with a reference signal, and generates the control signal corresponding to each of the plurality of gain bands so as to equalize the gain in the optical amplification in each of the plurality of gain bands, and
wherein the characteristic of each of the plurality of tone signals is the frequency of the each of the plurality of tone signals or a modulation depth with which the each of the plurality of tone signals is modulated,
  the tone-signal generation unit decreases the modulation depth of one of the plurality of tone signals or increases a difference between a predetermined frequency and the frequency of the one of the plurality of tone signals in order to increase the gain in the optical amplification in one of the plurality of gain bands corresponding to the one of the plurality of tone signals, and
  the tone-signal generation unit increases the modulation depth of one of the plurality of tone signals or decreases a difference between the predetermined frequency and the frequency of the one of the plurality of tone signals in order to decrease the gain in the optical amplification in one of the plurality of gain bands corresponding to the one of the plurality of tone signals.

3. An optical transmission system comprising:
an optical terminal;
a plurality of optical-fiber transmission lines connected to the optical terminal; and an optical repeater arranged along the plurality of optical-fiber transmission lines;
the optical terminal includes,
  an optical-signal power detection unit which detects power of optical signals transmitted from the optical terminal in each of a plurality of gain bands through each of the plurality of optical-fiber transmission lines,
  a tone-signal generation unit which generates a plurality of tone signals respectively corresponding to the plurality of gain bands for each of the plurality of optical-fiber transmission lines, where each of the plurality of tone signals has a different frequency, and each of the plurality of tone signals for each of the plurality of optical-fiber transmission lines has a characteristic corresponding to the power of optical signals transmitted in one of a plurality of gain bands corresponding to the each of the plurality of tone signals in the each of the plurality of optical-fiber transmission lines, and
  an optical transmission unit which transmits the plurality of tone signals together with optical signals through each of the plurality of optical-fiber transmission lines;
the optical repeater includes
  an optical amplification unit which realizes optical amplification in each of the plurality of gain bands with a gain which is determined based on a control signal,
  a characteristic-signal generation unit which receives the plurality of tone signals from each of the plurality of optical-fiber transmission lines, and generates a plurality of characteristic signals each representing the characteristic of one of the plurality of tone signals received from each of the plurality of optical-fiber transmission lines,
  an averaging unit which obtains for each of the plurality of gain bands an average of ones of the plurality of characteristic signals corresponding to both of the plurality of optical-fiber transmission lines and the each of the plurality of gain bands, and
  a gain control unit which compares the average with a reference signal, and generates the control signal for each of the plurality of gain bands so as to equalize the gain in the optical amplification in each of the plurality of gain bands.

4. An optical terminal comprising:
an optical-signal power detection unit which detects power of optical signals transmitted from the optical terminal in each of a plurality of gain bands;
a tone-signal generation unit which generates a plurality of tone signals respectively corresponding to the plurality of gain bands, where each of the plurality of tone signals has a different frequency and a characteristic corresponding to the power of optical signals in one of the plurality of gain bands corresponding to the each of the plurality of tone signals; and
an optical transmission unit which transmits the plurality of tone signals together with optical signals through an optical-fiber transmission line,
wherein the characteristic of each of the plurality of tone signals is the frequency of the each of the plurality of tone signals or a modulation depth with which the each of the plurality of tone signals is modulated,
  the tone-signal generation unit decreases the modulation depth of one of the plurality of tone signals or increases a difference between a predetermined frequency and the frequency of the one of the plurality of tone signals in order to increase a gain in optical amplification in one of the plurality of gain bands corresponding to the one of the plurality of tone signals, and
  the tone-signal generation unit increases the modulation depth of one of the plurality of tone signals or decreases a difference between the predetermined frequency and the frequency of the one of the plurality of tone signals in order to decrease a gain in optical amplification in one of the plurality of gain bands corresponding to the one of the plurality of tone signals.

5. An optical repeater comprising:
an optical amplification unit which realizes optical amplification in each of a plurality of gain bands with a gain which is determined based on a control signal;
a characteristic-signal generation unit which receives a plurality of tone signals, and generates a plurality of characteristic signals each representing a characteristic of one of the plurality of tone signals; and
a gain control unit which compares each of the plurality of characteristic signals with a reference signal, and generates the control signal corresponding to each of the plurality of gain bands so as to equalize the gain in the optical amplification in each of the plurality of gain bands,
wherein the characteristic-signal generation unit includes,
a photoelectric conversion unit which receives the plurality of tone signals, and generates an electric signal representing the plurality of tone signals, a plurality of frequency filters which respectively extract the plurality of tone signals from the electric signal, and
a smoothing unit which smoothes the plurality of tone signals extracted by the plurality of frequency filters so as to generate the plurality of characteristic signals.

6. An optical repeater being able to be connected to a plurality of optical-fiber transmission lines and comprising:
an optical amplification unit which realizes optical amplification in each of a plurality of gain bands with a gain which is determined based on a control signal,
a characteristic-signal generation unit which receives a plurality of tone signals from each of the plurality of optical-fiber transmission lines, and
generates a plurality of characteristic signals each representing a characteristic of one of the plurality of tone signals received from each of the plurality of optical-fiber transmission lines,
an averaging unit which obtains for each of the plurality of gain bands an average of ones of the plurality of characteristic signals corresponding to both of the plurality of optical-fiber transmission lines and the each of the plurality of gain bands, and
a gain control unit which compares the average with a reference signal, and generates the control signal for each of the plurality of gain bands so as to equalize the gain in the optical amplification in each of the plurality of gain bands.

7. An optical transmission system comprising:
an optical terminal;
an optical-fiber transmission line connected to the optical terminal; and
an optical repeater arranged along the optical-fiber transmission line;
the optical terminal includes,
an optical-signal power detection unit which detects power of optical signals transmitted from the optical terminal in each of a plurality of gain bands,
a tone-signal generation unit which generates a plurality of tone signals respectively corresponding to the plurality of gain bands, where each of the plurality of tone signals has a different frequency and a characteristic corresponding to the power of optical signals in one of the plurality of gain bands corresponding to the each of the plurality of tone signals, and
an optical transmission unit which transmits the plurality of tone signals together with optical signals through the optical-fiber transmission line;

the optical repeater includes,
a first optical amplification unit which realizes optical amplification in a first one of the plurality of gain bands with constant light emission,
a second optical amplification unit which realizes optical amplification in each of the plurality of gain bands except for the first one of the plurality of gain bands with a gain which is determined based on a control signal,
a characteristic-signal generation unit which receives the plurality of tone signals, and generates a plurality of characteristic signals each representing the characteristic of one of the plurality of tone signals, and
a gain control unit which compares each of the plurality of characteristic signals corresponding to the plurality of gain bands except for the first one of the plurality of gain bands with a reference signal, and generates the control signal corresponding to each of the plurality of gain bands except for the first one of the plurality of gain bands so as to equalize the gain in the optical amplification in each of the plurality of gain bands, where the reference signal is one of the plurality of characteristic signals corresponding to the first one of the plurality of gain bands.

8. The optical transmission system according to claim 7, wherein the characteristic-signal generation unit comprises,
a photoelectric conversion unit which receives the plurality of tone signals, and generates an electric signal representing the plurality of tone signals,
a plurality of frequency filters which respectively extract the plurality of tone signals from the electric signal, and
a smoothing unit which smoothes the plurality of tone signals extracted by the plurality of frequency filters so as to generate the plurality of characteristic signals.

9. The optical transmission system according to claim 7, wherein the characteristic of each of the plurality of tone signals is the frequency of the each of the plurality of tone signals or a modulation depth with which the each of the plurality of tone signals is modulated,
the tone-signal generation unit decreases the modulation depth of one of the plurality of tone signals or increases a difference between a predetermined frequency and the frequency of the one of the plurality of tone signals in order to increase the gain in the optical amplification in one of the plurality of gain bands corresponding to the one of the plurality of tone signals, and
the tone-signal generation unit increases the modulation depth of one of the plurality of tone signals or decreases a difference between the predetermined frequency and the frequency of the one of the plurality of tone signals in order to decrease the gain in the optical amplification in one of the plurality of gain bands corresponding to the one of the plurality of tone signals.

10. The optical transmission system according to claim 7, wherein the first optical amplification unit and the second optical amplification unit include more than two excitation light sources each of which emits excitation light having a different wavelength, and the optical transmission system further comprises an optical multiplexing unit which optically multiplexes the excitation light emitted by the more than two excitation light sources.

11. The optical transmission system according to claim 7, further comprising a driving control unit which activates and deactivates the second optical amplification unit.

12. The optical transmission system according to claim 7, wherein the first optical amplification unit and the second optical amplification unit inject excitation light into the optical-fiber transmission line, which is used as an amplification medium in the optical amplification.

13. An optical transmission system comprising:
   an optical terminal;
   a plurality of optical-fiber transmission lines connected to the optical terminal; and an optical repeater arranged along the plurality of optical-fiber transmission lines;
   the optical terminal includes,
      an optical-signal power detection unit which detects power of optical signals transmitted from the optical terminal in each of a plurality of gain bands through each of the plurality of optical-fiber transmission lines,
      a tone-signal generation unit which generates a plurality of tone signals respectively corresponding to the plurality of gain bands for each of the plurality of optical-fiber transmission lines, where each of the plurality of tone signals has a different frequency, and each of the plurality of tone signals for each of the plurality of optical-fiber transmission lines has a characteristic corresponding to the power of optical signals transmitted in one of a plurality of gain bands corresponding to the each of the plurality of tone signals in the each of the plurality of optical-fiber transmission lines, and
      an optical transmission unit which transmits the plurality of tone signals together with optical signals through each of the plurality of optical-fiber transmission lines;
   the optical repeater includes,
      a first optical amplification unit which realizes optical amplification in a first one of the plurality of gain bands in each of the plurality of optical-fiber transmission lines with constant light emission,
      a second optical amplification unit which realizes optical amplification in each of the plurality of gain bands except for the first one of the plurality of gain bands in each of the plurality of optical-fiber transmission lines, with a gain which is determined based on a control signal,
      a characteristic-signal generation unit which receives the plurality of tone signals from each of the plurality of optical-fiber transmission lines, and generates a plurality of characteristic signals each representing the characteristic of one of the plurality of tone signals received from each of the plurality of optical-fiber transmission lines,
      an averaging unit which obtains for each of the plurality of gain bands an average of ones of the plurality of characteristic signals corresponding to both of the plurality of optical-fiber transmission lines and the each of the plurality of gain bands, and
   a gain control unit which compares the average obtained for each of the plurality of gain bands except for the first one of the plurality of gain bands, with a reference signal, and generates the control signal for each of the plurality of gain bands except for the first one of the plurality of gain bands so as to equalize the gain in the optical amplification in each of the plurality of gain bands, where the reference signal is the average obtained for the first one of the plurality of gain bands.

14. An optical terminal comprising:
   an optical-signal power detection unit which detects power of optical signals transmitted from the optical terminal in each of a plurality of gain bands;
   a tone-signal generation unit which generates a plurality of tone signals respectively corresponding to the plurality of gain bands, where each of the plurality of tone signals has a different frequency and a characteristic corresponding to the power of optical signals in one of the plurality of gain bands corresponding to the each of the plurality of tone signals; and
   an optical transmission unit which transmits the plurality of tone signals together with optical signals through an optical-fiber transmission line,
wherein the characteristic of each of the plurality of tone signals is the frequency of the each of the plurality of tone signals or a modulation depth with which the each of the plurality of tone signals is modulated,
   the tone-signal generation unit decreases the modulation depth of one of the plurality of tone signals or increases a difference between a predetermined frequency and the frequency of the one of the plurality of tone signals in order to increase a gain in optical amplification in one of the plurality of gain bands corresponding to the one of the plurality of tone signals, and
   the tone-signal generation unit increases or decreases a difference between the predetermined frequency and the frequency of the one of the plurality of tone signals in order to decrease a gain in optical amplification in one of the plurality of gain bands corresponding to the one of the plurality of tone signals.

15. An optical repeater comprising:
   a first optical amplification unit which realizes optical amplification in a first one of a plurality of gain bands with constant light emission,
   a second optical amplification unit which realizes optical amplification in each of the plurality of gain bands except for the first one of the plurality of gain bands with a gain which is determined based on a control signal,
   a characteristic-signal generation unit which receives a plurality of tone signals, and generates a plurality of characteristic signals each representing a characteristic of one of the plurality of tone signals, and
   a gain control unit which compares each of the plurality of characteristic signals corresponding to the plurality of gain bands except for the first one of the plurality of gain bands with a reference signal, and generates the control signal corresponding to each of the plurality of gain bands except for the first one of the plurality of gain bands so as to equalize the gain in the optical amplification in each of the plurality of gain bands, where the reference signal is one of the plurality of characteristic signals corresponding to the first one of the plurality of gain bands.

16. The optical repeater according to claim 15, wherein the first optical amplification unit and the second optical amplification unit inject an excitation light into an optical-fiber transmission line, which is used as an amplification medium in the optical amplification.

17. The optical repeater according to claim 15, wherein the characteristic-signal generation unit comprises,
   a photoelectric conversion unit which receives the plurality of tone signals, and generates an electric signal representing the plurality of tone signals,
   a plurality of frequency filters which respectively extract the plurality of tone signals from the electric signal, and
   a smoothing unit which smoothes the plurality of tone signals extracted by the plurality of frequency filters so as to generate the plurality of characteristic signals.

18. The optical repeater according to claim 15, wherein the first optical amplification and the second optical amplification unit include more than two excitation light sources each of which emits excitation light having a different wavelength, and the optical repeater further comprises an optical multiplexing unit which optically multiplexes the excitation light emitted by the more than two excitation light sources.

19. The optical repeater according to claim 15, further comprising a driving control unit which activates and deactivates the second optical amplification unit.

20. An optical repeater being able to be connected to a plurality of optical-fiber transmission lines and comprising:
a first optical amplification unit which realizes optical amplification in a first one of a plurality of gain bands in each of the plurality of optical-fiber transmission lines with constant light emission,
a second optical amplification unit which realizes optical amplification in each of the plurality of gain bands except for the first one of the plurality of gain bands in each of the plurality of optical-fiber transmission lines, with a gain which is determined based on a control signal,
a characteristic-signal generation unit which receives a plurality of tone signals from each of the plurality of optical-fiber transmission lines, and generates a plurality of characteristic signals each representing a-characteristic of one of the plurality of tone signals received from each of the plurality of optical-fiber transmission lines,
an averaging unit which obtains for each of the plurality of gain bands an average of ones of the plurality of characteristic signals corresponding to both of the plurality of optical-fiber transmission lines and the each of the plurality of gain bands, and
a gain control unit which compares the average obtained for each of the plurality of gain bands except for the first one of the plurality of gain bands, with a reference signal, and generates the control signal for each of the plurality of gain bands except for the first one of the plurality of gain bands so as to equalize the gain in the optical amplification in each of the plurality of gain bands, where the reference signal is the average obtained for the first one of the plurality of gain bands.

* * * * *